United States Patent
Gerstel et al.

(10) Patent No.: US 7,369,772 B2
(45) Date of Patent: May 6, 2008

(54) OPTICAL LINE TERMINAL ARRANGEMENT, APPARATUS AND METHODS

(75) Inventors: Ornan A. Gerstel, Los Altos, CA (US); Rajiv Ramaswami, Sunnyvale, CA (US)

(73) Assignee: Tellabs Operations, Inc., Naperville, IL (US)

( * ) Notice: Subject to any disclaimer, the term of this patent is extended or adjusted under 35 U.S.C. 154(b) by 592 days.

(21) Appl. No.: 10/737,765

(22) Filed: Dec. 18, 2003

(65) Prior Publication Data
US 2004/0131356 A1   Jul. 8, 2004

Related U.S. Application Data

(62) Division of application No. 09/293,775, filed on Apr. 19, 1999, now Pat. No. 6,721,508.

(60) Provisional application No. 60/112,510, filed on Dec. 14, 1998.

(51) Int. Cl.
  *H04J 14/02* (2006.01)
  *H04J 14/00* (2006.01)
(52) U.S. Cl. .................. 398/79; 398/82; 398/83; 398/45; 398/48
(58) Field of Classification Search .............. 398/45, 398/49, 50, 51, 54, 56, 57, 58, 59, 79, 82, 398/83, 43, 48, 66
See application file for complete search history.

(56) References Cited

U.S. PATENT DOCUMENTS

| | | | |
|---|---|---|---|
| 4,821,255 A | 4/1989 | Kobrinski | 370/3 |
| 5,317,439 A | 5/1994 | Fatehi et al. | 359/110 |
| 5,457,556 A | 10/1995 | Shiragaki | 359/117 |
| 5,488,500 A | 1/1996 | Glance | 359/127 |
| 5,493,625 A | 2/1996 | Glance | 385/24 |
| 5,504,827 A | 4/1996 | Schimpe | 385/24 |
| 5,550,818 A * | 8/1996 | Brackett et al. | 370/395.51 |
| 5,675,676 A | 10/1997 | Yamashita et al. | 385/24 |
| 5,708,753 A | 1/1998 | Frigo et al. | 385/147 |
| 5,712,932 A | 1/1998 | Alexander et al. | 385/24 |
| 5,739,935 A | 4/1998 | Sabella | 359/128 |
| 5,760,934 A | 6/1998 | Sutter et al. | 359/119 |
| 5,771,112 A | 6/1998 | Hamel et al. | 359/128 |
| 5,777,761 A | 7/1998 | Fee | 359/110 |
| 5,778,118 A | 7/1998 | Sridhar | 385/24 |
| 5,867,289 A | 2/1999 | Gerstel et al. | 359/110 |
| 5,884,017 A | 3/1999 | Fee | 395/182.02 |

(Continued)

OTHER PUBLICATIONS

R. Ramaswami, "Multiwavelength Lightwave Networks for Computer Communication," IEEE Communications Magazine, pp. 78-88 (1993).

(Continued)

*Primary Examiner*—M. R. Sedighian
(74) *Attorney, Agent, or Firm*—Fitzpatrick, Cella, Harper & Scinto

(57) ABSTRACT

A wavelength division multiplexed optical communication system including a first optical line interface optically coupled to a first transponder and an optical demultiplexer through which the first optical line interface is not optically coupled to the first transponder. The system also includes a second optical line interface and at least one switch. The switch is operable to optically couple the second optical line interface to (a) the first optical line interface through at least the optical demultiplexer, and alternatively (b) the second transponder. A method for an optical add/drop multiplexing system also is provided.

24 Claims, 6 Drawing Sheets

U.S. PATENT DOCUMENTS

| | | | |
|---|---|---|---|
| 5,903,370 A * | 5/1999 | Johnson | 398/4 |
| 6,084,694 A | 7/2000 | Milton et al. | 359/124 |
| 6,295,146 B1 | 9/2001 | Nathan et al. | 359/119 |
| 6,493,117 B1 | 12/2002 | Milton et al. | 359/124 |
| 2002/0071154 A1 | 6/2002 | Gerstel et al. | 359/124 |

OTHER PUBLICATIONS

R. Ramaswami et al., "Design of Logical Topologies for Wavelength-Routed Optical Networks," IEEE Journal on Selected Areas in Communications, V. 14, N. 5, pp.840-851 (1996).

O. Gerstel et al., " Cost Effective Traffic Grooming in WDM Rings," IEEE Infocom, San Francisco, Mar. 29-Apr. 2, 1998, pp. 69-77.

R. Ramaswami et al., "Routing and Wavelength Assignment in All-Optical Networks," IEEE/ACM Transactions on Networking, V. 3, No. 5, pp. 489-500 (1995).

R. Ramaswami et al., "Multiwavelength Optical Networks with Limited Wavelength Conversion," IEEE Infocom, vol. 2, pp. 489-498, 1997.

R. Ramaswami et al., *Optical Networks, A Practical Perspective*, Academic Press (1998). (Complete Book).

* cited by examiner

OPTICAL LINE TERMINAL ARRANGEMENT, APPARATUS AND METHODS

CROSS-REFERENCE TO RELATED APPLICATIONS

This application is a division of application Ser. No. 09/293,775, filed Apr. 19, 1999, now U.S. Pat. No. 6,721,508 which claims the benefit of U.S. Provisional Application No. 60/112,510, filed Dec. 14, 1998.

FIELD OF THE INVENTION

The invention is in the field of optical telecommunications, and more particularly, pertains to upgrading an in-service wavelength division multiplexed (WDM) optical communication system including a pair of optical line terminals (OLTs) that reside in the same office and are part of separate WDM networks to form an all optical pass-through from the line side of one OLT of the pair to the line side of the other OLT of the pair.

BACKGROUND OF THE INVENTION

Wavelength division multiplexing (WDM) is an approach for increasing the capacity of existing fiber optic networks. A WDM system employs plural optical signal channels, each channel being assigned a particular channel wavelength. In a WDM system optical signal channels are generated, multiplexed to form an optical signal comprised of the individual optical signal channels, transmitted over a single waveguide, and demultiplexed such that each channel wavelength is individually routed to a designated receiver.

SUMMARY OF THE INVENTION

In typical wavelength division multiplexing systems all wavelengths are constrained to pass through from a source optical node to a predetermined sink optical node.

In view of the above it is an aspect of the invention to selectively pass-through, add or drop individual wavelengths at selected optical nodes.

It is another aspect of the invention to utilize optical line terminals having all-optical pass-through interfaces that provide for continued transmission of optical signals without any intervening electro-optical conversion, and to connect two optical line terminals back-to-back at their respective pass-through interfaces to provide an optical path from the line side interface of the first optical line terminal to the line side interface of the second optical line terminal.

It is yet another aspect of the invention to utilize optical line terminals having a multiplexer/demultiplexer including one or more stages for inputting/outputting individual wavelengths or bands of a predetermined number of wavelengths, or a combination of bands and individual wavelengths.

It is a further aspect of the invention to utilize the optical line terminals to support complex mesh network structures while permitting growth of an in-service network without disrupting network service.

It is yet a further aspect of the invention to provide a wavelength division multiplexed optical communication system including a plurality of optical line terminals, each having a line interface and an all-optical pass-through interface including a plurality of pass-through optical ports and each also including a plurality of local optical ports and an optical multiplexer/demultiplexer for multiplexing/demultiplexing transmitted/received wavelengths. The optical multiplexer/demultiplexer may include one or more stages for inputting/outputting individual wavelengths or bands of a predetermined number of wavelengths, or a combination of bands and individual wavelengths, with at least one of the pass-through optical ports of one of the optical line terminals being connected to at least one of the pass-through optical ports of another optical line terminal to form an optical path from the line side interface of the one of the optical line terminals to the line side interface of the another optical line terminal.

These and other aspects and advantages of the invention will be apparent to those of skill in the art from the following detailed description.

DETAILED DESCRIPTION

Figure 1:
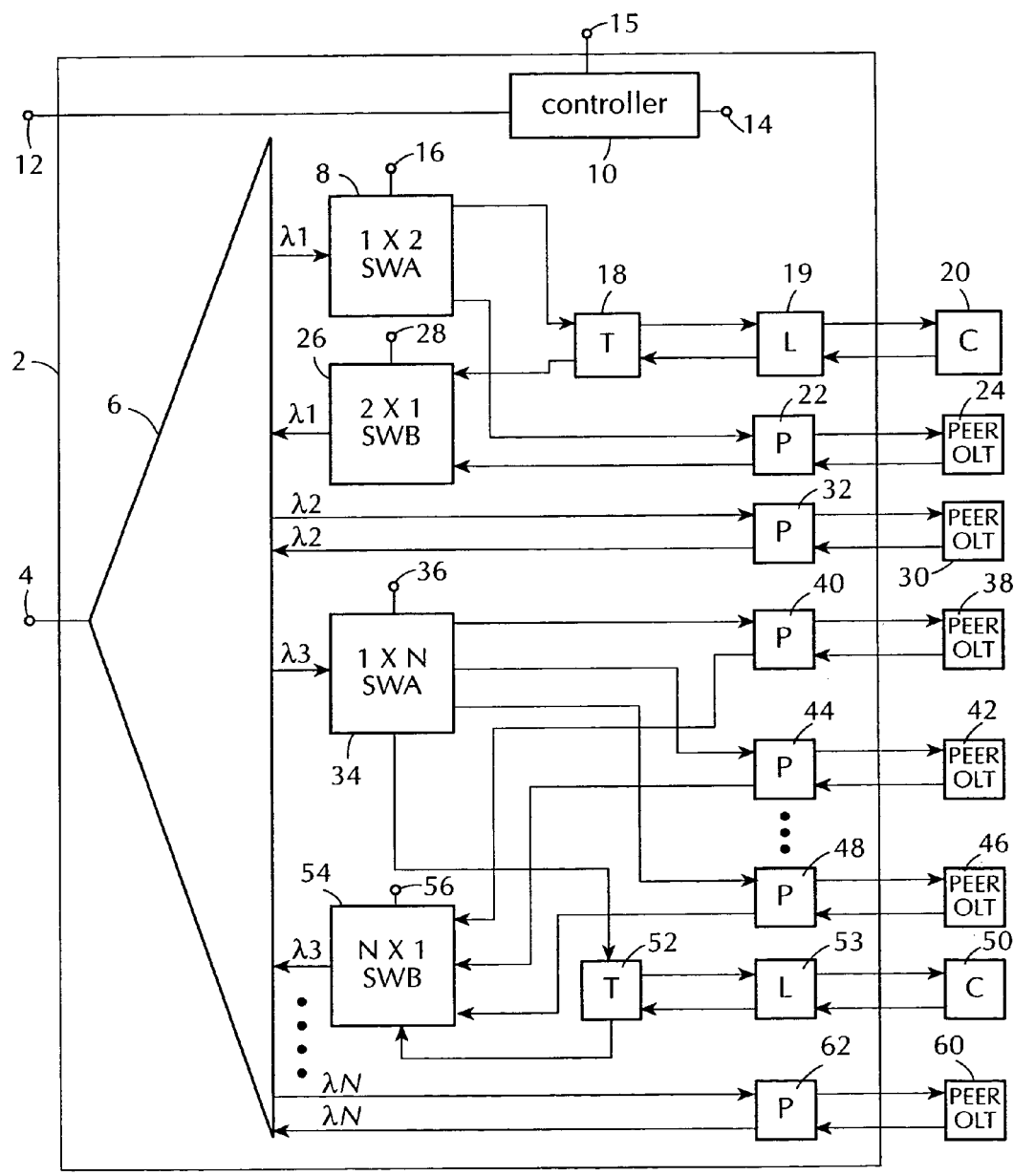
FIG. 1 is a block diagram of an optical line terminal.

FIG. 1 is a block diagram of an optical line terminal (OLT) 2 which is the basic element of the present embodiment. The OLT 2 has an input/output line interface 4 which is connected to an external fiber facility and transmits/receives an optical signal having N optical wavelengths, for example 32 wavelengths, on a single optical fiber which is multiplexed/demultiplexed by a multiplexer/demultiplexer 6, which outputs demultiplexed wavelengths $\lambda 1$-$\lambda N$ on individual optical fibers. The respective wavelengths $\lambda 1$-$\lambda N$ are sent either to a peer OLT via a pass-through port or to client equipment via a transponder and a local port. The client equipment includes SONET equipment, add/drop multiplexers, cross-connect switches, internet protocol (IP) routers, asynchronous transfer mode switches (ATM) and the like.

As employed herein an optical signal is generally intended to encompass wavelengths in the range of approximately 300 nanometers to approximately 2000 nanometers (UV to far IR). This range of wavelengths can be accommodated by the preferred type of optical conductor (a fiber optic), which typically operates in the range of approximately 800 nanometers to approximately 1600 nanometers.

Consider $\lambda 1$ which is provided to a 1×2 switch 8 which is controlled by a control signal, having at least N states, from a controller 10. The controller 10 responds to a command, from a management system (not shown), at a terminal 12 to provide the control signal at a terminal 14 and then to control terminal 16 of switch 8 to position the switch 8 in a first or second position. When in the first position, $\lambda 1$ is provided to a transponder 18 which transmits $\lambda 1$ to a client apparatus 20 via a local port 19. When in the second position λ1 is provided to a pass-through port 22 to a corresponding pass-through port in a peer OLT 24. The control signal is also provided to output terminal 15, and then to control terminal 16 of a corresponding switch 8 in peer OLT 24 to route λ1 to the corresponding multiplexer/demultiplexer 6. If it is desired to send λ1 to both client apparatus 20 and peer OLT 24, an optical splitter can be used in place of the switch 8.

Switch 26 selects λ1 coming from the opposite direction in response to a control signal at terminal 28 from controller 10 to position switch 26 in a first or second position. When in the first position, λ1 is received from client 20 via local port 19 and transponder 18, and when in the second position λ1 is received from peer OLT 24 via pass-through port 22, and then is provided to multiplexer/demultiplex 6 to be multiplexed with the other received wavelengths λ2-λN.

A wavelength can be directly passed-through to a peer OLT rather than being sent to a client apparatus. For example, λ2 is directly sent to, and received from, peer OLT 30 via pass-through port 32.

A 1×N switch can be used to send/receive a wavelength to/from one of N−1 peer OLTs or a client apparatus. For example, 1×N switch 34 under control of a control signal, having at least N states, provided to terminal 36 from controller 10 sends λ3 to either peer OLT 38 via pass-through port 40, or peer OLT 42 via pass-through port 44, or peer OLT 46 via pass-through port 48 or client apparatus 50 via transponder 52 and local port 53. Reception of λ3 in the opposite direction is controlled by N×1 switch 54 under control of a control signal provided to terminal 56 from controller 10, and than is provided to multiplexer/demultiplexer 6 to be multiplexed with the other received wavelengths.

As discussed above, a wavelength can be passed-through to a peer OLT via a pass-through port or can be optically switched to a client apparatus via a local port. λN is shown as being directly passed through to, or received from, peer OLT 60 via pass-through port 62.

Figure 2:
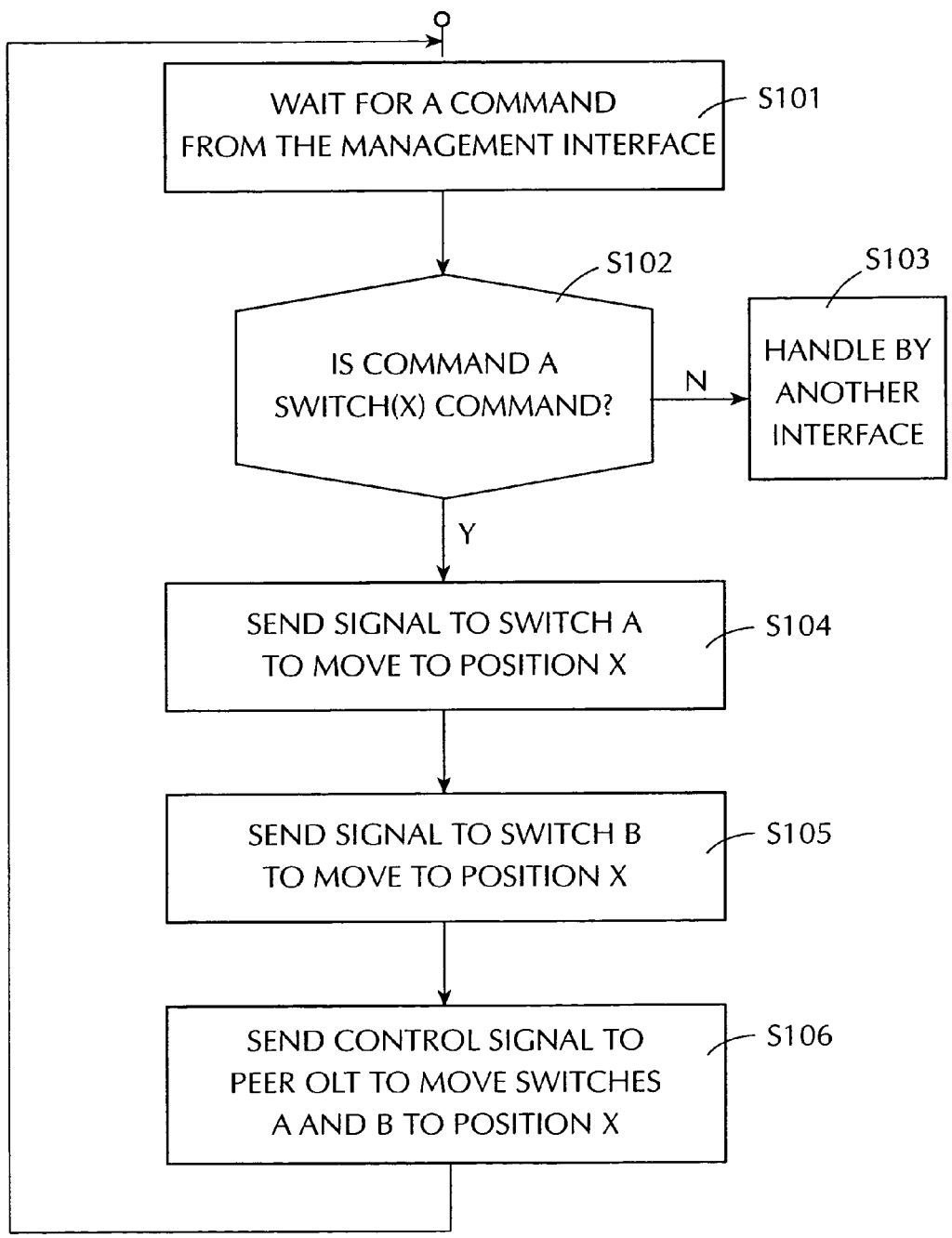
FIG. 2 is a flow chart of the control steps executed by the controller 10 of FIG. 1.

FIG. 2 is a flow chart of the steps performed by the controller 10 of FIG. 1 to control the 1×2 switches 8 and 26, and the 1×N switches 34 and 54 to route the respective wavelengths λ1-λN.

In step S101 the controller 10 waits for a command from a management system such as a computer (not shown). At step S102 a determination is made as to whether or not the command is a switch control signal to either pass-through the wavelength via a pass-through port to a peer OLT or drop/add the wavelength locally at/from a client apparatus via a transponder and a local port. If the answer is no, the command is handled by another interface (not shown) at step S103. If the answer is yes, a signal is sent to switch A (for example switch 8 or 34) to move switch A to transmit position X (the selected position) at step S104, and at S105 a signal is sent to switch B (for example switch 26 or 54) to move switch B to receive position X (the selected position). At step 106 the control signal at terminal 15 of controller 10 is sent to the peer OLT to set its switches A and B in a corresponding manner. A loop-back is then made to step S101 to wait for the next command.

In the multiplexer/demultiplexer 6 of FIG. 1, 32 wavelengths on a single optical fiber received at line interface 4 are demultiplexed into 32 individual wavelengths λ1-λ32. However, according to another aspect of the invention the 32 wavelengths can be demultiplexed into bands, for example four bands of 8 wavelengths each, by a first multiplexer, and the resultant four bands can be processed by the OLT. According to another aspect of the invention at least one of the four bands of wavelengths can be demultiplexed by a second multiplexer/demultiplexer into its individual wavelengths such that the OLT can process the individual wavelengths of the at least one band and the remaining ones of the four bands.

Figure 3:
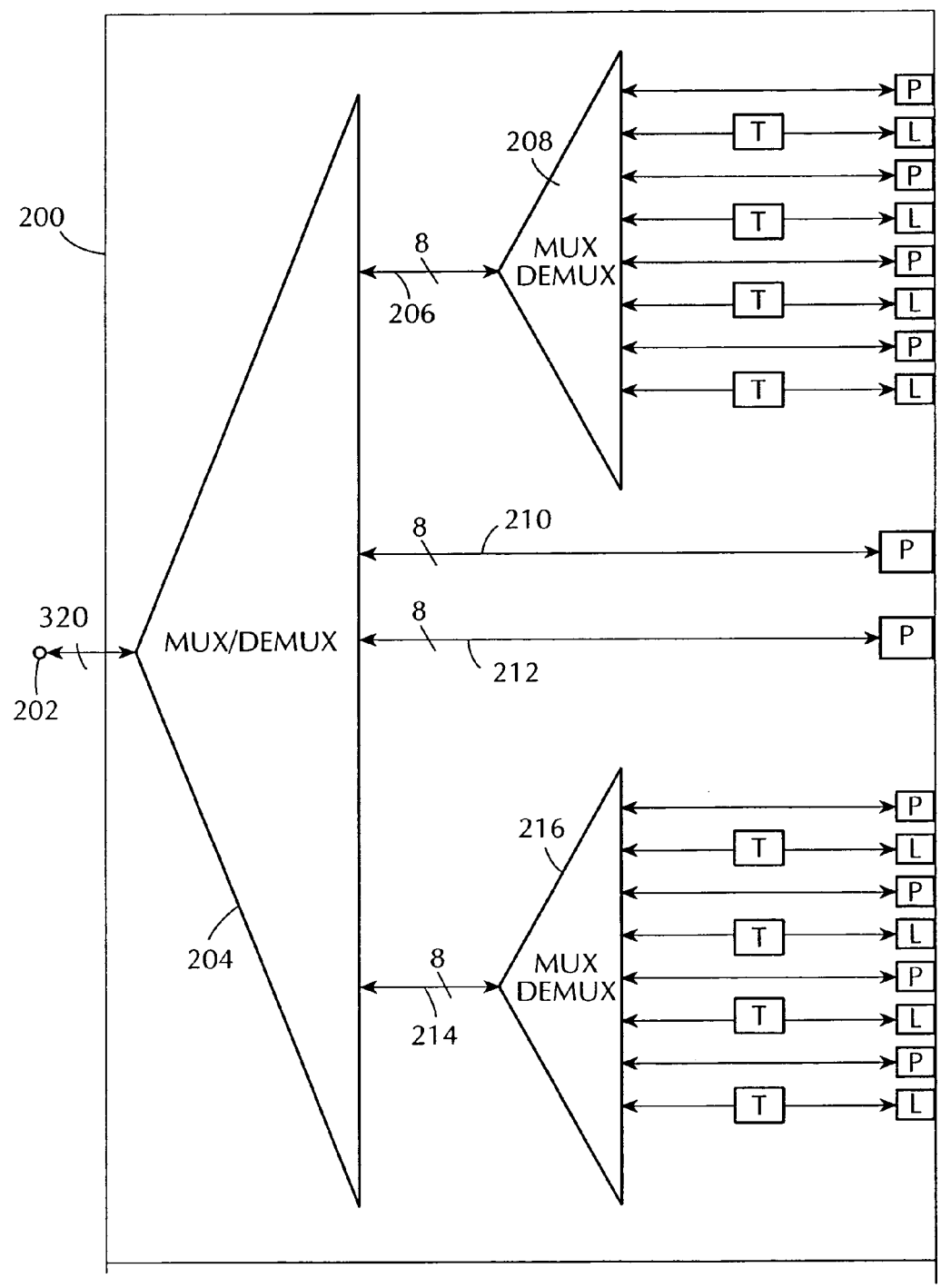
FIG. 3 is a block diagram of an optical line terminal having a two-stage multiplexer/demultiplexer.

FIG. 3 is a block diagram illustrating a modular OLT 200 having two stages of multiplexing/demultiplexing. The operation of the OLT 200 is described with respect to the demultiplexing operation; however, it is to be understood that the multiplexing is merely the reverse operation. It is to be noted that the 1×2 switches and 1×N switches shown in FIG. 1 are not included in FIG. 3 in order to simplify the drawing. However, it is to be understood that in practice such switches may be utilized in the practice of the invention. The OLT terminal 200 has an input/output line interface 202 which is connected to an external fiber facility and receives on a single optical fiber N, for example 32, wavelengths which are demultiplexed by a multiplexer/demultiplexer 204, which is situated on a first modular card, into M, for example 4, bands of 8 wavelengths each. The first band 206 (λ1-λ8) is demultiplexed into its 8 individual wavelengths by a multiplexer/demultiplexer 208, which is situated on a second modular card, with each such wavelength being provided to a pass-through port (P) or a local port (L) via transponder (T). Each of the pass-through ports (P) is situated on a different modular card, and each of the transponder (T) and its associated local port (P) are situated together on yet another modular card. Although direct connections are shown, as discussed above the respective wavelengths may be selectively switched to either of a local port (L) via transponder (T), or a pass-through port (P) as described with respect to FIG. 1.

The second band 210 (λ9-λ16) is provided directly to a pass-through port (P), and the third band 212 (λ17-λ24) is provided directly to a pass-through port (P).

The fourth band 214 (λ25-λ32) is demultiplexed into its 8 individual wavelengths by a multiplexer/demultiplexer 216, which is situated on a modular card 217, with each such wavelength being provided to a pass-through port (P) or a local port (L) via a transponder (T). Again, switching may be used to select a connection to either P or T.

Figure 4:
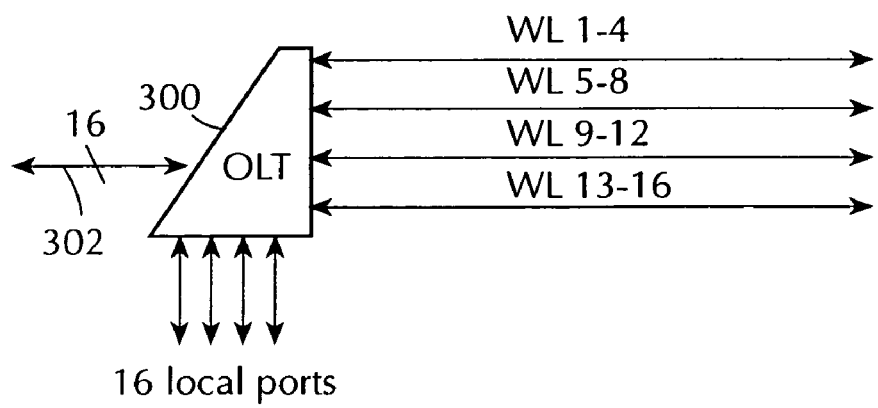
FIG. 4 is a schematic diagram representative of the optical line terminal of FIG. 1 or FIG. 3.

FIG. 4 is a simplified schematic diagram representative of the OLT 2 shown in FIG. 1 or the OLT 200 of FIG. 3. However, it is to be noted that for simplicity only 16 wavelengths are utilized. The OLT 300 interfaces and operates in a bidirectional manner as discussed in detail with respect to FIGS. 1 and 3. The line interface 302 is adapted for wavelength division multiplexed (WDM) optical communication signals of the highest relative order, in this example 16 wavelengths λ1-λ16, corresponding to the N optical wavelengths on a single optical fiber which are applied to input/output line interfaces 4 and 202 of OLT 2 (FIG. 1) and OLT 200 (FIG. 3), respectively. The pass-through interface connected to the lines WL 1-4, WL 5-8, WL 9-12 and WL 13-16 corresponds to the respective pass-through ports, and the local-interface connected to the lines labeled 16 local ports correspond to the local ports connected to the respective transponders, where wavelengths from or to client equipment are added or dropped.

Figure 5:
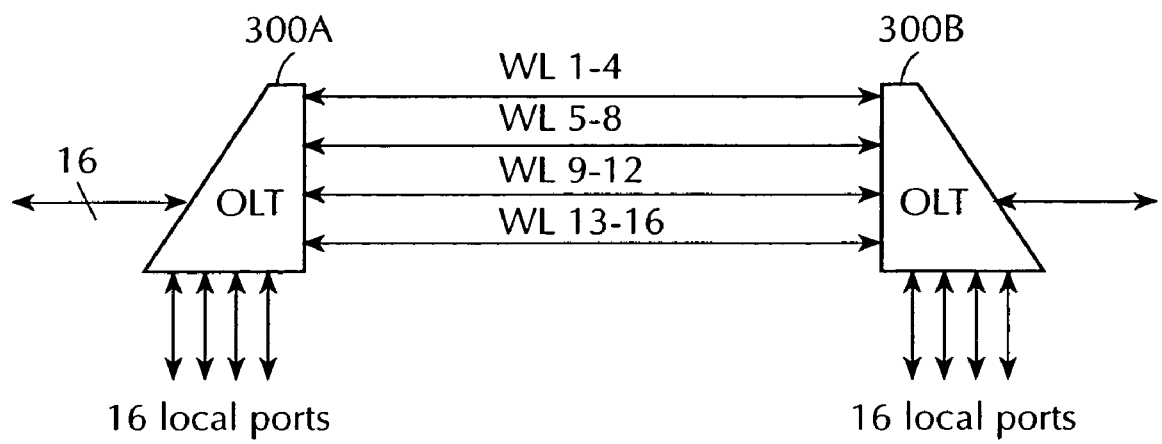
FIG. 5 is a schematic diagram of two optical line terminals such as in FIG. 4 being connected back-to-back.

FIG. 5 illustrates two OLTs 300A and 300B as shown in FIG. 4 connected in a back-to-back relationship by way of their respective all-optical pass-through interfaces. Thus, it is seen that the connection results in an optical add/drop multiplexer (OADM) functionality without requiring intermediate electro-optical conversion (OEO) of the communicated optical signals. As discussed above, the add/drop feature is achieved at the 16 local ports of each OLT, where channels (wavelengths) can be added or dropped by a manual configuration, or via add/drop switching, as controlled by switches 8 and 26 of FIG. 1, to achieve a switchable add/drop multiplexer.

The pass-through may be accomplished using single conductors and/or ribbon connectors that pass multiple individual channels (wavelengths) in one cable. The pass-through connections between OLTS 300A and 300B is preferably made using ribbon connectors/cables.

Figure 6:
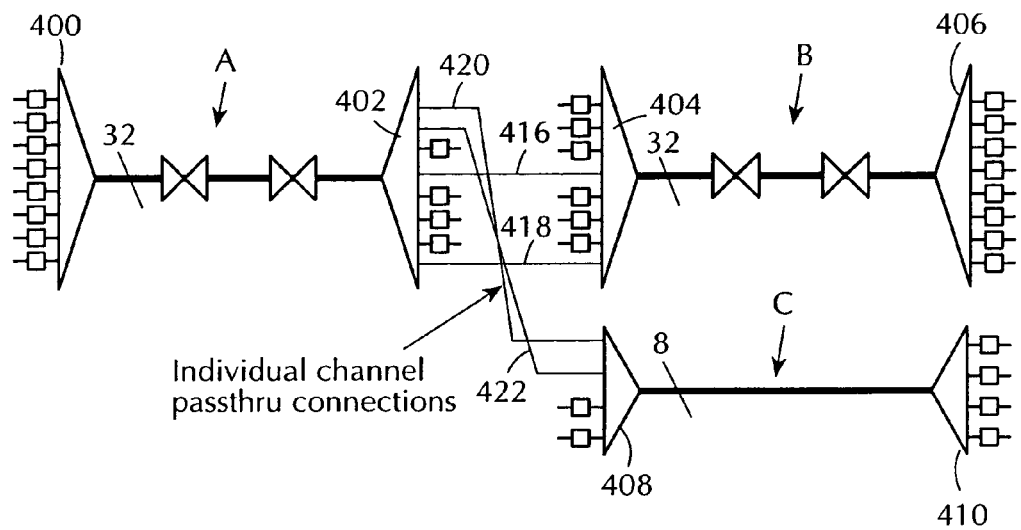
FIG. 6 is a diagram illustrating how at least two separate point-to-point WDM systems can be upgraded while in-service to form a merged point-to-point WDM system.

FIG. 6 illustrates three separate in-service WDM point-to-point optical communication systems A, B and C which are not initially interconnected. WDM system A includes optical nodes 400 and 402 which are optically connected via their respective line interfaces, with at least optical node 402 being an OLT. WDM system B includes optical nodes 404 and 406 which are optically connected via their respective line interfaces, with at least optical node 404 being an OLT. WDM system C includes optical nodes 408 and 410 which are optically connected via their respective line interfaces, with at least optical node 408 being an OLT.

As discussed above, the three separate WDM systems are not initially interconnected. However, any two of the three WDM systems, or all three of the WDM systems, may be interconnected by connecting respective OLTs of the separate WDM system back-to-back at respective pass-through ports as shown in FIG. 5, without disrupting service. For example, WDM system A may be connected to WDM system B by directly optically connecting pass-through ports of the OLT of node 402 to pass-through ports of the OLT of node 404 via optical fibers 416 and 418. WDM system A may also be connected to WDM system C by directly optically connecting pass-through optical ports of the OLT of node 402 to pass-through ports of the OLT of node 408 via optical fibers 420 and 422. Thus, an all optical path is provided from optical node 400 of WDM system A to optical node 406 of WDM system B, and likewise an all optical path is provided from optical node 400 of WDM system A to optical node 410 of WDM system C, resulting in a merger of WDM systems A, B and C without disrupting service. At the back-side of the respective optical nodes, lines with a box are indicative of local ports (L) to which client equipment is normally connected.

Figure 7:
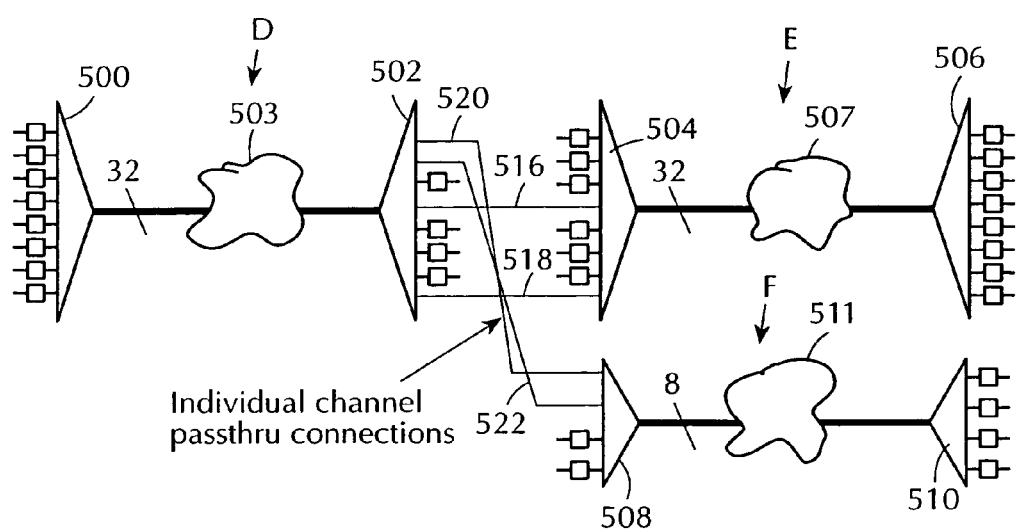
FIG. 7 is a diagram illustrating how at least two separate network WDM systems can be upgraded while in-service to form a merged network WDM system.

FIG. 7 illustrates three separate in-service WDM network optical communication systems D, E and F which are not initially interconnected. WDM system D includes optical nodes 500 and 502 which are optically connected via their respective line interfaces through an optical network 503, with at least optical node 502 being an OLT. WDM system E includes optical nodes 504 and 506 which are optically connected via their respective line interfaces through an optical network 507, with at least optical node 504 being an OLT. WDM system F includes optical nodes 508 and 510 which are optically connected via their respective line interfaces through an optical network 511, with at least optical node 508 being an OLT.

As discussed above, the three separate WDM optical networks are not initially interconnected. However, any two of the three WDM optical networks, or all three of the WDM optical networks may be interconnected by connecting respective OLTs of the separate WDM optical networks back-to-back at respective pass-through ports as shown in FIG. 5, without disrupting service. For example, WDM optical network D may be connected to WDM optical network E by directly optically connecting pass-through ports of the OLT of node 502 to pass-through ports of the OLT of node 504 via optical fibers 516 and 518. WDM system D may also be connected to WDM optical network F by directly optically connecting pass-through optical ports of the OLT of node 502 to pass-through ports of the OLT of node 508 via optical fibers 520 and 522. Thus, an all optical path is provided from optical node 500 of WDM optical network D to optical node 506 of WDM optical network E, and likewise an all optical path is provided from optical node 500 of WDM optical network D to optical node 510 of WDM optical network F, resulting in a merger of WDM network optical communication systems D, E and F without disrupting service. At the back-side of the respective optical nodes, lines with a box are indicative of local ports (L) to which client equipment is normally connected.

Figure 8:
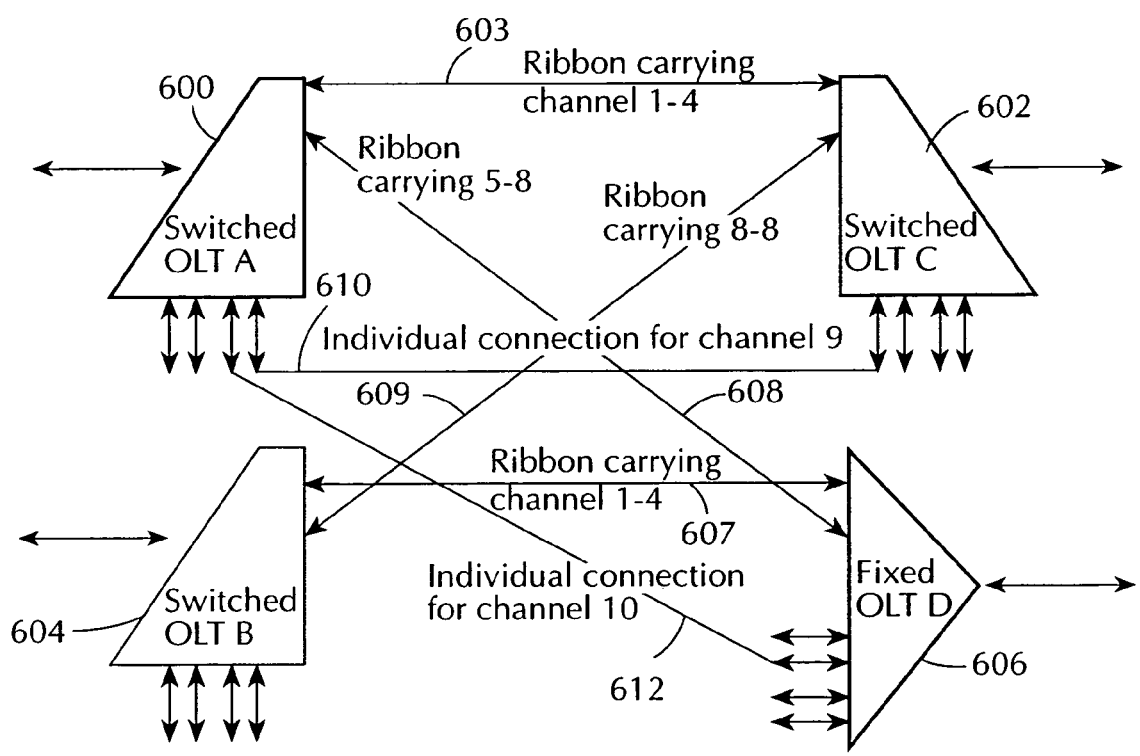
FIG. 8 illustrates a mesh connection between a plurality of optical line terminals.

FIG. 8 illustrates how OLTs can be connected in more complex ways to achieve greater functionality, such as, for example, limited cross-connection capabilities. Specifically, OLT 600 and OLT 602 are connected back-to-back to form a first OADM, OLT 604 and OLT 606 are connected back-to-back to form a second OADM, OLT 600 and OLT 606 are connected back-to-back to form a third OADM and OLT 602 and OLT 604 are connected back-to-back to form a fourth OADM. OLT 600, OLT 602 and OLT 604 each have add/drop switching capability, whereas OLT 606 has no switching capability.

The arrangement shown in FIG. 8 illustrates how a group of OLTs in an office, which may be part of separate WDM networks, can be coupled to form different OADMs on an individual channel or per band basis. Wavelengths 1, 2, 3 and 4 (channels 1, 2, 3 and 4) are connected between pass-through optical ports of OLT 600 and OLT 602 via optical fiber 603 and are also connected between pass-through optical ports of OLT 604 and OLT 606 via optical fiber 607. Wavelengths 5, 6, 7 and 8 (channels 5, 6, 7 and 8) are connected between pass-through optical ports of OLT 600 and OLT 606 via optical fiber 608 and are also connected between pass-through optical ports of OLT 602 and OLT 604 via optical fiber 609. Wavelengths 9, 10, 11 and 12 (channels 9, 10, 11 and 12) can be separated into individual channels that are connected between local ports of the respective OLTs. For example, channel 9 is directly connected between a local port of OLT 600 and a local port of OLT 602 via optical fiber 610, and channel 10 is directly connected between a local port of OLT 600 and a local port of OLT 606 via optical fiber 612. To simplify the drawing, no connections are shown for wavelengths 11 and 12; however, they may be connected in a like manner. The local ports may also be connected to client equipment as discussed above. It is to be noted that the connection configuration of FIG. 8 does not constitute a plain patch-panel form of connectivity, insofar as it allows for switching of channels without manual reconfigurations.

In summary, the methods and apparatus of the present invention allow upgrading of a wavelength division multiplexed optical communication system including a pair of OLTs that reside in the same office or facility and are part of separate WDM networks (whether point-to-point links or more advanced networks) to form an OADM. Such upgrade is accomplished without service disruption to the network by appropriate connection of the OLTs through the pass-through interfaces.

Although certain embodiments of the invention have been described and illustrated herein, it will be readily apparent to those of ordinary skill in the art that a number of modifications and substitutions can be made to the preferred example methods and apparatus disclosed and described herein without departing from the true spirit and scope of the invention.

What is claimed is:

1. A wavelength division multiplexed optical communication system comprising:
   a first optical line interface optically coupled to a first transponder;
   a first local port optically coupled to the first transponder;
   an optical demultiplexer through which the first optical line interface is not optically coupled to the first transponder;
   a second optical line interface;
   a second local port optically coupled to a second transponder; and
   at least one switch operable to optically couple the second optical line interface to (a) the first optical line interface through at least the optical demultiplexer, and alternatively (b) the second transponder.

2. The wavelength division multiplexed optical communication system of claim 1, wherein the optical switch is a N×1 optical switch.

3. The wavelength division multiplexed optical communication system of claim 1, wherein the second optical line interface is optically coupled to the first optical line interface when the optical switch is in a first position, and wherein alternatively the second optical line interface is optically coupled to the second transponder when the optical switch is in a second position.

4. The wavelength division multiplexed optical communication system of claim 1, wherein the first optical line interface is optically coupled to the first transponder through at least another optical demultiplexer.

5. The wavelength division multiplexed optical communication system of claim 1, wherein the first optical line interface is optically coupled to the first transponder through at least another optical demultiplexer and at least one other optical switch.

6. An optical add/drop multiplexing system for a wavelength division multiplexed (WDM) optical network environment, comprising:
   a first optical line interface operable to receive from a WDM network an optical signal comprising a plurality of wavelengths multiplexed therein;
   a first transponder optically coupled to the first optical line interface, wherein the system is operable to communicate a wavelength from the first optical line interface to the first transponder to drop the wavelength;
   an optical demultiplexer through which the first line interface is not optically coupled to the first transponder;
   a second transponder;
   a second optical line interface operable to transmit to a WDM network an optical signal comprising a plurality of wavelengths multiplexed therein;
   an optical switch operable in a first state of the system to optically couple the first optical line interface to the second optical line interface through at least the optical demultiplexer, and alternatively operable in a second state of the system to optically couple the second transponder to the second optical line interface; and
   wherein in the first state the system is operable to communicate a wavelength from the first optical line interface to the second line optical interface without any intermediate electro-optical conversion (OEO) to pass the wavelength, and wherein in the second state the system is operable to communicate a wavelength from the second transponder to the second optical line interface to add the wavelength.

7. The optical add/drop multiplexing system of claim 6, further comprising a third optical line interface operable to receive from a WDM network another optical signal comprising a plurality of wavelengths multiplexed therein, and wherein the optical switch is alternatively operable in a third state of the system to optically couple the third optical line interface to the second optical line interface, and wherein in the third state of the system the system is operable to communicate a wavelength from the third optical line interface to the second optical line interface without any intermediate electro-optical conversion (OEO) to pass the wavelength.

8. The optical add/drop multiplexing system of claim 7, wherein the first, second and third optical line interfaces reside in a same office but each interface to separate WDM networks.

9. The optical add/drop multiplexing system of claim 6, wherein the optical switch is a N×1 optical switch.

10. The optical add/drop multiplexing system of claim 6, wherein the optical switch is one of a plurality of optical switches of the system that are each operable to communicate to the second optical line interface an individual wavelength that is a different wavelength than the individual wavelength communicated to the second optical line interface by each other optical switch of the plurality of optical switches.

11. The optical add/drop multiplexing system of claim 6, wherein the optical demultiplexer resides on a modular card of the system, and wherein in the first state of the system the first optical line interface is optically coupled to the second optical line interface through at least the optical demultiplexer and an optical fiber.

12. The optical add/drop multiplexing system of claim 6, wherein the first transponder resides on a first modular card of the system, and wherein the optical demultiplexer resides on a second modular card of the system that is not the first modular card, and wherein the first transponder is optically coupled to the first optical line interface through at least an optical fiber, and wherein in the first state of the system the first optical line interface is optically coupled to the second optical line interface through at least the optical demultiplexer and an optical fiber.

13. The optical add/drop multiplexing system of claim 6, wherein the first transponder resides on a first modular card of the system, and wherein the first transponder is optically coupled to the first optical line interface through at least an optical fiber and another optical demultiplexer that resides on a second modular card of the system.

14. An optical add/drop multiplexing system for a wavelength division multiplexed (WDM) optical network environment, comprising:
   a first WDM network bidirectional optical line interface;
   a first transponder to which a first optical path of the system extends from the first line interface, wherein the first transponder resides on a first modular card of the system, and wherein the system is operable to communicate a wavelength along the first optical path from the first WDM network bidirectional optical line interface to the first transponder to drop the wavelength, and wherein intermediate the first WDM network bidirectional optical line interface and the first transponder the first optical path extends through at least a first optical demultiplexer;
   a second optical demultiplexer through which the first optical path does not extend, wherein the second optical demultiplexer resides on a second modular card of the system that is not the first modular card;

an optical multiplexer through which the first optical path does not extend;

a second transponder, wherein the second transponder resides on a third modular card of the system;

a second WDM network bidirectional optical line interface;

an optical switch from which a second optical path of the system extends to the second WDM network bidirectional optical line interface in both a first state of the system and a second state of the system, wherein in the first state the second optical path extends to the second WDM network bidirectional optical line interface from the first WDM network bidirectional optical line interface and is established by at least the second optical demultiplexer, the optical multiplexer, and the optical switch intermediate the second optical demultiplexer and the optical multiplexer, and wherein in the second state the second optical path alternatively extends to the second WDM network bidirectional optical line interface from the second transponder and is established by at least the optical switch and the optical multiplexer;

wherein in the first state the system is operable to communicate a wavelength along the second optical path from the first WDM network bidirectional optical line interface to the second WDM network bidirectional optical line interface without any intermediate electro-optical conversion (OEO) to pass the wavelength, and wherein in the second state the system is operable to communicate a wavelength along the second optical path from the second transponder to the second WDM network bidirectional optical line interface to add the wavelength; and wherein the optical switch is a first switch of a plurality of optical switches of the system that are each operable to communicate to the second WDM network bidirectional optical line interface an individual wavelength that is a different wavelength than the individual wavelength communicated to the second WDM network bidirectional optical line interface by each other optical switch of the plurality of optical switches.

15. The optical add/drop multiplexing system of claim 14, further comprising a third WDM network bidirectional optical line interface, and wherein in a third state of the system the second optical path alternatively extends to the second WDM network bidirectional optical line interface from the third WDM network bidirectional optical line interface and is established by at least the first switch and the optical multiplexer, and wherein in the third state the system is operable to communicate a wavelength along the second optical path from the third WDM network bidirectional optical line interface to the second WDM network bidirectional optical line interface without any intermediate electro-optical conversion (OEO) to pass the wavelength.

16. The optical add/drop multiplexing system of claim 15, wherein the first, second and third WDM network bidirectional optical line interfaces reside in a same office but each interface to separate WDM networks.

17. A method for an optical add/drop multiplexing system in a wavelength division multiplexed (WDM) optical network environment, comprising the steps of:

establishing at least a first optical path extending from a first optical line interface of the system to a local transponder;

establishing at least a second optical path that in a first state of the system extends from a local transponder to a second optical line interface of the system and is established by at least an optical switch, and in a second state of the system the second optical path alternatively extends from the first optical line interface to the second optical line interface and is established by at least both the optical switch and an optical demultiplexer through which the first optical path does not extend;

in the first state of the system, communicating a wavelength along the second optical path to add the wavelength to a WDM signal the system transmits to a WDM network from the second optical line interface; and in the second state of the system, alternatively communicating along the second optical path a wavelength of a WDM signal received from a WDM network at the first optical line interface to optically pass the wavelength to a WDM signal the system transmits to a WDM network from the second optical line interface.

18. The method of claim 17, further comprising the step of communicating along the first optical path a wavelength of a WDM signal received from a WDM network at the first optical line interface to drop the wavelength.

19. The method of claim 17, wherein the optical switch is a N×1 switch.

20. The method of claim 19, wherein N is at least 3, and wherein the second optical path is established in a third state of the system to alternatively extend from a third optical line interface to the second optical line interface and is established by at least the optical switch and an optical demultiplexer through which the first optical path does not extend, and wherein the method in the third state of the system further comprises the step of alternatively communicating along the second optical path a wavelength of a WDM signal received from a WDM network at the third optical line interface to pass the wavelength to a WDM signal the system transmits to a WDM network from the second optical line interface.

21. The method of claim 20, wherein the first, second and third optical line interfaces reside in a same office but each interface to separate WDM networks.

22. The method of claim 17, wherein at least a portion of the system comprises a plurality of modular cards, and wherein at least a portion of the second optical path in at least the second state of the system extends from one of the modular cards to another of the modular cards.

23. The method of claim 17, wherein the optical switch is one of a plurality of optical switches that are each operable to communicate to the second optical line interface an individual wavelength, and further comprising the step of communicating to the second optical line interface from each of the optical switches an individual wavelength that is a different wavelength than the individual wavelength communicated to the second optical line interface by each other optical switch of the plurality of optical switches.

24. A method for an optical add/drop multiplexing system in a wavelength division multiplexed (WDM) optical network environment, comprising the steps of:

establishing at least a first optical path extending from a first optical line interface of the system to a local transponder;

establishing at least a second optical path that in a first state of the system extends from a local transponder to a second optical line interface of the system and is established by at least an optical switch, and in a second state of the system the second optical path alternatively extends from the first optical line interface to the second optical line interface and is established by at least both the optical switch and an optical demultiplexer through which the first optical path does not extend, and in a third state of the system the second optical path alternatively extends from a third optical line interface to the second optical line interface and is established by at least both the optical switch and an optical demultiplexer through which the first optical path does not extend;

communicating along the first optical path a wavelength of a WDM signal received from a WDM network at the first optical line interface to drop the wavelength;

in the first state of the system, communicating a wavelength along the second optical path to add the wavelength to a WDM signal the system transmits to a WDM network from the second optical line interface;

in the second state of the system, alternatively communicating along the second optical path a wavelength of a WDM signal received from a WDM network at the first optical line interface to pass the wavelength to a WDM signal the system transmits to a WDM network from the second optical line interface;

in the third state of the system, alternatively communicating along the second optical path a wavelength of a WDM signal received from a WDM network at the third optical line interface to pass the wavelength to a WDM signal the system transmits to a WDM network from the second optical line interface;

wherein at least a portion of the system comprises a plurality of modular cards, and wherein at least a portion of the second optical path in at least each of the second and third states of the system extends from one of the modular cards to another of the modular cards; and wherein the optical switch is one of a plurality of optical switches, and further comprising the step of communicating to the second optical line interface from each of the optical switches an individual wavelength that is a different wavelength than the individual wavelength communicated to the second optical line interface by each other optical switch of the plurality of optical switches.

* * * * *

(12) EX PARTE REEXAMINATION CERTIFICATE (8459th)
United States Patent
Gerstel et al.

(10) Number: US 7,369,772 C1
(45) Certificate Issued: Aug. 9, 2011

(54) OPTICAL LINE TERMINAL ARRANGEMENT, APPARATUS AND METHODS

(75) Inventors: Ornan A. Gerstel, Los Altos, CA (US); Rajiv Ramaswami, Sunnyvale, CA (US)

(73) Assignee: Tellabs Operations Inc., Naperville, IL (US)

Reexamination Request:
No. 90/010,763, Dec. 9, 2009

Reexamination Certificate for:
Patent No.: 7,369,772
Issued: May 6, 2008
Appl. No.: 10/737,765
Filed: Dec. 18, 2003

Related U.S. Application Data

(62) Division of application No. 09/293,775, filed on Apr. 19, 1999, now Pat. No. 6,721,508.
(60) Provisional application No. 60/112,510, filed on Dec. 14, 1998.

(51) Int. Cl.
*H04J 14/02* (2006.01)
*H04J 14/00* (2006.01)

(52) U.S. Cl. .............................. 398/79; 398/82; 398/83; 398/45; 398/48
(58) Field of Classification Search ...................... 398/79
See application file for complete search history.

(56) References Cited

U.S. PATENT DOCUMENTS

| | | |
|---|---|---|
| 4,109,300 A | 8/1978 | Reimer |
| 4,300,239 A | 11/1981 | Wakabayashi et al. |
| 4,593,154 A | 6/1986 | Takeda et al. |
| 4,787,081 A | 11/1988 | Waters et al. |
| 4,821,255 A | 4/1989 | Kobrinski |
| 4,850,045 A | 7/1989 | Funke |
| 4,887,309 A | 12/1989 | Anderson et al. |
| 4,903,338 A | 2/1990 | Funke |
| 5,058,103 A | 10/1991 | Shimizu |
| 5,060,224 A | 10/1991 | Konishi |

(Continued)

FOREIGN PATENT DOCUMENTS

| | | |
|---|---|---|
| EP | 1 039 670 | 9/2000 |
| EP | 1 202 595 A1 | 5/2002 |
| EP | 1 434 374 A1 | 6/2004 |
| EP | 1 628 424 | 2/2006 |
| GB | 8601545 | 1/1986 |
| JP | 05-226780 | 9/1993 |
| JP | 08-111447 | 4/1996 |
| JP | 08-248455 | 9/1996 |
| JP | 9-261175 | 10/1997 |
| WO | WO 95/19689 | 7/1995 |
| WO | WO/2008/008277 | 1/2008 |

OTHER PUBLICATIONS

Keang-Po Ho and Shien-Kuei Liaw, "Eight-channel bidirectional WDM add/drop multiplexer," Electronic Letters, vol. 34, No. 10, pp. 947-948 (May 14, 1998).

(Continued)

*Primary Examiner*—Andrew Nalven

(57) ABSTRACT

A wavelength division multiplexed optical communication system including a first optical line interface optically coupled to a first transponder and an optical demultiplexer through which the first optical line interface is not optically coupled to the first transponder. The system also includes a second optical line interface and at least one switch. The switch is operable to optically couple the second optical line interface to (a) the first optical line interface through at least the optical demultiplexer, and alternatively (b) the second transponder. A method for an optical add/drop multiplexing system also is provided.

At the time issuance and publication of this certificate, the patent remains subject to pending reexamination control number 95/000,485 filed Jul. 6, 2009. The claim content of the patent may be subsequently revised if a reexamination certificate issues from the reexamination proceeding.

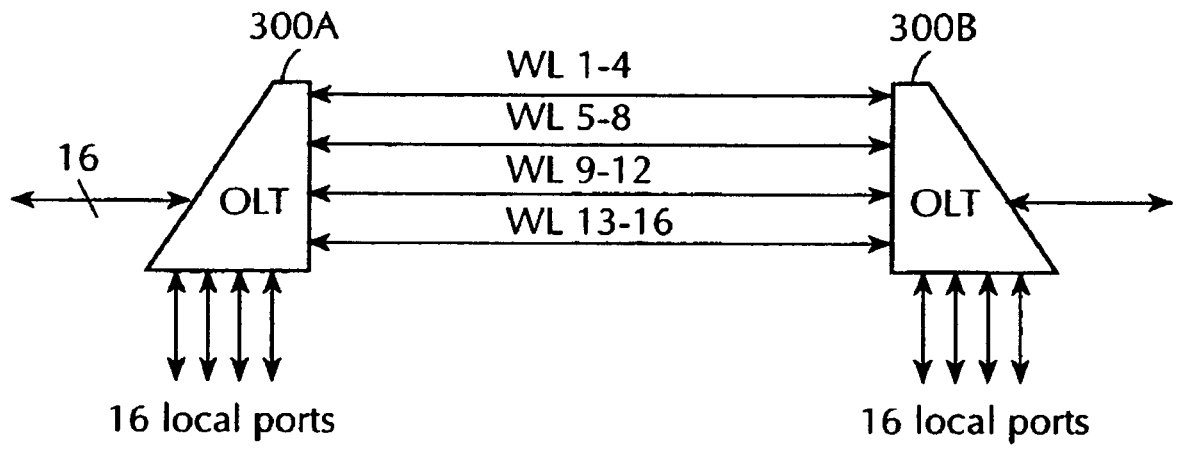

U.S. PATENT DOCUMENTS

| | | |
|---|---|---|
| 5,060,226 A | 10/1991 | Gewin et al. |
| 5,081,619 A | 1/1992 | Nagata |
| 5,150,243 A | 9/1992 | Suzuki |
| 5,159,595 A | 10/1992 | Flanagan et al. |
| 5,187,706 A | 2/1993 | Frankel et al. |
| 5,212,713 A | 5/1993 | Firsch |
| 5,216,666 A | 6/1993 | Stalick |
| 5,218,600 A | 6/1993 | Schenkyr et al. |
| 5,265,096 A | 11/1993 | Parruck |
| 5,289,474 A | 2/1994 | Purcell et al. |
| 5,305,322 A | 4/1994 | Kabaya et al. |
| 5,311,501 A | 5/1994 | Takatsu |
| 5,317,439 A | 5/1994 | Fatehi et al. |
| 5,365,518 A | 11/1994 | Noser |
| 5,367,395 A | 11/1994 | Yajima et al. |
| 5,386,418 A | 1/1995 | Komuro et al. |
| 5,406,404 A | 4/1995 | DiGiovanni et al. |
| 5,436,746 A | 7/1995 | Hirst |
| 5,446,726 A | 8/1995 | Rostoker et al. |
| 5,450,512 A | 9/1995 | Asakura |
| 5,457,556 A | 10/1995 | Shiragaki et al. |
| 5,488,500 A | 1/1996 | Glance |
| 5,493,625 A | 2/1996 | Glance |
| 5,500,756 A | 3/1996 | Tsushima et al. |
| 5,504,827 A | 4/1996 | Schimpe |
| 5,521,737 A | 5/1996 | Suyama |
| 5,526,163 A | 6/1996 | Suyama |
| 5,533,006 A | 7/1996 | Uchida |
| 5,550,818 A | 8/1996 | Brackett et al. |
| 5,574,722 A | 11/1996 | Slykhouse et al. |
| 5,600,481 A | 2/1997 | Nakabayashi |
| 5,612,805 A | 3/1997 | Fevrier et al. |
| 5,619,489 A | 4/1997 | Chang et al. |
| 5,627,969 A | 5/1997 | Kobayashi et al. |
| 5,673,129 A | 9/1997 | Mizrahi |
| 5,675,676 A | 10/1997 | Yamashita |
| 5,680,490 A | 10/1997 | Cohen et al. |
| 5,708,753 A | 1/1998 | Frigo et al. |
| 5,712,932 A | 1/1998 | Alexander et al. |
| 5,717,510 A | 2/1998 | Ishikawa et al. |
| 5,717,795 A | 2/1998 | Sharma et al. |
| 5,726,788 A | 3/1998 | Fee et al. |
| 5,729,527 A | 3/1998 | Gerstel et al. |
| 5,739,935 A | 4/1998 | Sabella |
| 5,742,416 A | 4/1998 | Mizrahi |
| 5,760,934 A | 6/1998 | Sutter et al. |
| 5,771,112 A | 6/1998 | Hamel et al. |
| 5,777,761 A | 7/1998 | Fee |
| 5,778,118 A | 7/1998 | Sridhar |
| 5,790,287 A | 8/1998 | Darcie et al. |
| 5,790,520 A | 8/1998 | Iwamoto et al. |
| 5,796,501 A | 8/1998 | Sotom et al. |
| 5,805,320 A | 9/1998 | Kuroyanagi et al. |
| 5,822,519 A | 10/1998 | Watanabe |
| 5,825,515 A | 10/1998 | Anderson |
| 5,825,520 A | 10/1998 | Huber |
| 5,831,970 A | 11/1998 | Arao |
| 5,864,414 A | 1/1999 | Barnsley et al. |
| 5,867,289 A | 2/1999 | Gerstel et al. |
| 5,867,291 A | 2/1999 | Wu et al. |
| 5,884,017 A | 3/1999 | Fee |
| 5,903,370 A | 5/1999 | Johnson |
| 5,930,016 A | 7/1999 | Brorson et al. |
| 5,940,197 A | 8/1999 | Ryu |
| 5,953,141 A | 9/1999 | Liu et al. |
| 5,959,767 A | 9/1999 | Fatehi et al. |
| 5,960,133 A | 9/1999 | Tomlinson |
| 5,986,783 A | 11/1999 | Sharma et al. |
| 5,999,290 A | 12/1999 | Li |
| 5,999,291 A | 12/1999 | Anderson |
| 6,008,916 A | 12/1999 | Khaleghi |
| 6,025,947 A | 2/2000 | Sugaya et al. |
| 6,055,092 A | 4/2000 | Sugaya et al. |
| 6,061,157 A | 5/2000 | Terahara |
| 6,084,694 A | 7/2000 | Milton et al. |
| 6,097,859 A | 8/2000 | Solgaard et al. |
| 6,101,011 A | 8/2000 | Taylor |
| 6,108,113 A | 8/2000 | Fee |
| 6,108,311 A | 8/2000 | Ramaswami et al. |
| 6,115,157 A | 9/2000 | Barnard et al. |
| 6,115,517 A | 9/2000 | Shiragaki et al. |
| 6,134,047 A | 10/2000 | Flood et al. |
| 6,141,125 A | 10/2000 | Blair et al. |
| 6,169,016 B1 | 1/2001 | Chien et al. |
| 6,169,616 B1 | 1/2001 | Cao |
| 6,204,943 B1 | 3/2001 | Hamel et al. |
| 6,204,946 B1 | 3/2001 | Aksyuk et al. |
| 6,208,442 B1 | 3/2001 | Liu et al. |
| 6,208,443 B1 | 3/2001 | Liu et al. |
| 6,233,074 B1 | 5/2001 | Lahat et al. |
| 6,240,222 B1 | 5/2001 | Bergmann |
| 6,249,510 B1 | 6/2001 | Thompson |
| 6,263,126 B1 | 7/2001 | Cao |
| 6,272,154 B1 | 8/2001 | Bala et al. |
| 6,278,689 B1 | 8/2001 | Afferton et al. |
| 6,285,478 B1 | 9/2001 | Liu et al. |
| 6,285,479 B1 | 9/2001 | Okazaki et al. |
| 6,295,146 B1 | 9/2001 | Nathan et al. |
| 6,297,895 B1 | 10/2001 | Okuno |
| 6,307,657 B1 | 10/2001 | Ford |
| 6,333,799 B1 | 12/2001 | Bala et al. |
| 6,351,323 B1 | 2/2002 | Onaka et al. |
| 6,351,581 B1 | 2/2002 | Doerr et al. |
| 6,356,367 B1 | 3/2002 | DeCusatis et al. |
| 6,404,948 B2 | 6/2002 | Alexander et al. |
| 6,426,815 B1 | 7/2002 | Koehler |
| 6,433,900 B1 | 8/2002 | Kuroyanagi et al. |
| 6,452,701 B1 | 9/2002 | Terahara et al. |
| 6,459,516 B1 | 10/2002 | Mizrahi et al. |
| 6,487,686 B1 | 11/2002 | Yamazaki et al. |
| 6,493,117 B1 | 12/2002 | Milton et al. |
| 6,504,630 B1 | 1/2003 | Czarnocha et al. |
| 6,545,783 B1 | 4/2003 | Wu et al. |
| 6,567,196 B1 | 5/2003 | Archambault |
| 6,606,427 B1 | 8/2003 | Graves et al. |
| 6,631,018 B1 | 10/2003 | Milton et al. |
| 6,721,508 B1 | 4/2004 | Gerstel et al. |
| 6,771,905 B1 | 8/2004 | Bortz |
| 6,782,203 B2 | 8/2004 | Lin et al. |
| 6,853,763 B1 | 2/2005 | McNicol et al. |
| 6,868,201 B1 | 3/2005 | Johnson et al. |
| 6,898,376 B1 | 5/2005 | Gerstel et al. |
| 6,970,433 B1 | 11/2005 | Ramaswami et al. |
| 6,973,229 B1 | 12/2005 | Tzathas et al. |
| 7,009,966 B2 | 3/2006 | Borchering |
| 7,110,668 B2 | 9/2006 | Gerstel et al. |
| 7,133,616 B2 | 11/2006 | Caroli |
| 7,181,138 B2 | 2/2007 | Gerstel et al. |
| 7,184,666 B1 | 2/2007 | Li et al. |
| 7,227,681 B2 | 6/2007 | Sugaya et al. |
| 7,236,704 B1 | 6/2007 | Cao |
| 7,274,873 B2 | 9/2007 | Bortz |
| 7,292,786 B1 | 11/2007 | Barbarossa et al. |
| 7,369,772 B2 | 5/2008 | Gerstel et al. |
| 7,477,447 B2 | 1/2009 | Sugaya et al. |
| 7,630,634 B1 | 12/2009 | Boduch |
| 7,751,714 B2 | 7/2010 | Zhong et al. |
| 2001/0024542 A1 | 9/2001 | Aina et al. |
| 2002/0021862 A1 | 2/2002 | Zhou et al. |
| 2002/0057477 A1 | 5/2002 | Rocca et al. |
| 2002/0071154 A1 | 6/2002 | Gerstel et al. |

| | | | |
|---|---|---|---|
| 2002/0080440 A1 | 6/2002 | Li et al. |
| 2002/0093707 A1 | 7/2002 | Katagiri et al. |
| 2002/0097469 A1 | 7/2002 | Yee et al. |
| 2003/0002104 A1 | 1/2003 | Caroli et al. |
| 2003/0007209 A1 | 1/2003 | Liu et al. |
| 2003/0179741 A1 | 9/2003 | Goergen |
| 2004/0028407 A1 | 2/2004 | Noheji |
| 2004/0033079 A1 | 2/2004 | Sheth et al. |
| 2004/0076438 A1 | 4/2004 | Lee |
| 2004/0247239 A1 | 12/2004 | Eldada |
| 2005/0047795 A1 | 3/2005 | Windover et al. |
| 2005/0078461 A1 | 4/2005 | Dobbs et al. |
| 2005/0104508 A1 | 5/2005 | Ozawa et al. |
| 2005/0111504 A1 | 5/2005 | Nishikawa et al. |
| 2005/0195737 A1 | 9/2005 | Rajan et al. |
| 2005/0197720 A1 | 9/2005 | Morrison et al. |
| 2005/0281558 A1 | 12/2005 | Wang et al. |
| 2006/0034610 A1 | 2/2006 | Akiyama et al. |
| 2006/0115210 A1 | 6/2006 | Nakagawa |
| 2006/0133804 A1 | 6/2006 | Boduch et al. |
| 2006/0133807 A1 | 6/2006 | Jenkins et al. |
| 2007/0165299 A1 | 7/2007 | Sugaya et al. |
| 2007/0237524 A1 | 10/2007 | Gerstel et al. |
| 2008/0008474 A1 | 1/2008 | Boduch et al. |
| 2008/0013953 A1 | 1/2008 | Boduch et al. |
| 2008/0013954 A1 | 1/2008 | Boduch et al. |
| 2009/0086310 A1 | 4/2009 | Sugaya et al. |

OTHER PUBLICATIONS

Paul E. Green, Jr., Fiber Optic Networks, Prentice–Hall Inc., Englewood Cliffs, New Jersey, 1993.

"Optical Networking: Lucent Technologies Announces Optical Transponder Module in Miniature Package for High–Speed Optical Networking Systems—Product Announcement," EDGE, On & About AT&T, Mar. 8, 1999.

Aggarwal et al., "Efficient Routing in Optical Networks," Journal of the ACM, vol. 43, No. 6, Nov. 1996, pp. 973–1001.

Almstrom et al., "Cascadability of Optical Add/Drop Multiplexers," 24th European Conference on Optical Communication, Sep. 20–24, 1998, 1, pp. 589 and, 590.

Amendment of Jun. 29, 2009 in U.S. Appl. No. 12/042,793, which is a continuation of the '772 patent, pp. 1–7.

Antoniades et al., "Crosstalk Performance of A Wavelength Selective Cross–connect Mesh Topology," OFC '98 Technical Digest, Feb. 22–27, 1998, pp. 61 and 62.

Baroni et al., "Analysis and Design of Backbone Architecture Alternatives for IP Optical Networking," IEEE Journal on Selected Areas in Communications, vol. 18, No. 10, Oct. 2000, pp. 1980–1994.

Batchellor, "Optical Networking the Ericsson Way," OADM Workshop, Scheveningen/The Hague, Carlton Beach Hotel, Apr. 1998, pp. 1–4.

Berger et al., "Pan–European Optical Networking Using Wavelength Division Multiplexing," IEEE Communications Magazine, vol. 35, No. 4, Apr. 1997, pp. 82–88.

Berthold, "Evolution of WDM in Transport Networks," OFC '98 Technical Digest, Feb. 22–27, 1998, pp. 133 and 134.

Strebel et al., "4×2.5 Gbit/s, NRZ Transmission Experiments Over Crossconnects with Opto–Electronic Frequency Converters and Dispersion Compensated Standard Single–mode Fibre Links," IEICE Transactions on Communications, vol. E82–B, No. 8, Aug. 1999, pp. 1127–1130.

Chang et al., "Multiwavelength Reconfigurable WDM/ATM/SONET Network Testbed," Journal of Lightwave Technology, vol. 14, No. 6, Jun. 1996, pp. 1320–1340.

Chen et al., "Metro Optical Networking," Bell Labs Technical Journal, Jan.–Mar. 1999, pp. 163–186.

Chung et al., "All–Optical Gain–Clamped EDFAs with Different Feedback Wavelenghts for Use in Multiwavelength Optical Networks," Electronics Letters, vol. 32, No. 23, Nov. 7, 1996, p. 2159.

Clark, "Evolution of Optical Transport In the AT&T Network," OFC '98 Technical Digest, Feb. 22–27, 1998, p. 70.

Clark, "WDM Expands Fiber's Horizons," LAN Magazine, vol. 12, No. 3, Mar. 1997, pp. 67–71.

Complaint for Patent Infringement, *Tellabs Operations, Inc., v. Fujitsu Limited and Fujitsu Network Communications, Inc.*, Civil Action No. 08 CV 3379, Docket No. 1, Jun. 11, 2008, pp. 1–20.

Counterclaim Defendant Tellabs, Inc.'s Amended Answer and Counterclaims against Defendant Fujitsu Limited, *Tellabs Operations, Inc., v. Fujitsu Limited and Fujitsu Network Communications, Inc.*, Civil Action No. 08 CV 3379, Docket No. 121, Apr. 2, 2009, pp. 1–40.

Davis et al., "Optical Cross–Connect System Technology Trial," OFC '98 Technical Digest, Feb. 22–27, 1998, pp. 27 and 28.

De Zhong et al., "Multiwavelength Cross–Connects for Optical Transport Networks," Journal of Lightwave Technology, vol. 14, No. 7, Jul. 1996, pp. 1613–1620.

Declaration of Kim A. Winick In Support of Tellabs, Inc.'s, Tellabs Operation Inc.'s, and Tellabs North America's Responsive Claim Construction Brief (with Ex. 1 and Ex. 2), *Tellabs Operations, Inc., v. Fujitsu Limited and Fujitsu Network Communications, Inc.*, Civil Action No. 08 CV 3379, Docket No. 322–5, Jul. 20, 2010, pp. 1–68.

Declaration of Mark Dodd (with Ex. 1 through Ex. 12), *Tellabs Operations, Inc. v. Fujitsu Limited and Fujitsu Network Communications, Inc.*, Civil Action No. 08 CV 3379, Docket No. 322–1, Jul. 20, 2010, pp. 1–240.

Fujitsu Limited's and Fujitsu Network Communications, Inc.'s Opening Claim Construction Brief Addressing Claim Terms of Tellabs' Patent No. 7,369,772 (Confidential Version Filed Under Seal), *Tellabs Operations, Inc. v. Fujitsu Limited and Fujitsu Network Communications, Inc.*, Civil Action No. 08 CV 3379, Docket No. 298, Jun. 15, 2010, pp. 1–78.

Fujitsu Limited's and Fujitsu Network Communications, Inc.'s Opening Claim Construction Brief Addressing Claim Terms of Tellabs' Patent No. 7,369,772, *Tellabs Operations, Inc. v. Fujitsu Limited and Fujitsu Network Communications, Inc.*, Civil Action No. 08 CV 3379, Docket No. 298, Jun. 15, 2010, pp. 1–78.

Defendant Fujitsu Limited's Amended Answer and Affirmative Defenses to Plaintiff's Complaint And Defendant Fujitsu Limited's Amended Counterclaims Against Plaintiff, Tellabs, Inc. and Tellabs North America, Inc., and Demand for Jury Trial, *Tellabs Operations, Inc., v. Fujitsu Limited and Fujitsu Network Communications, Inc.*, Civil Action No. 08 CV 3379, Docket No. 119, Apr. 1, 2009, pp. 1–59.

Defendant Fujitsu Limited's Answer and Affirmative Defenses to Plaintiff's Complaint and Defendant Fujitsu Limited's Counterclaims Against Plaintiff and Tellabs, Inc. and Demand for Jury Trial, *Tellabs Operations, Inc. v. Fujitsu Limited and Fujitsu Network Communications, Inc.*, Civil Action No. 08 CV 3379, Docket No. 61, Sep. 5, 2008, pp. 1–16.

Defendant Fujitsu Network Communications, Inc.'s Amended Answer and Affirmative Defenses to Plaintiff's Complaint and Defendant Fujitsu Network Communications, Inc.'s Amended Counterclaims Against Plaintiff and Demand for Jury Trial, *Tellabs Operations, Inc. v. Fujitsu Limited and Fujitsu Network Communications, Inc.,* Civil Action No. 08 CV 3379, Docket No. 120, Apr. 1, 2009, pp. 1–54.

Defendants Fujitsu Limited's and Fujitsu Network Communications, Inc.'s Preliminary Invalidity Contentions (Amended), *Tellabs Operations, Inc. v. Fujitsu Limited and Fujitsu Network Communications, Inc.,* Civil Action No. 08 CV 3379, May 4, 2009, pp. 1–72.

Defendants Fujitsu Limited's and Fujitsu Network Communications, Inc.'s Preliminary Invalidity Contentions, *Tellabs Operations, Inc. v. Fujitsu Limited and Fujitsu Network Communications, Inc.,* Civil Action No. 08 CV 3379, Feb. 27, 2009, pp. 1–64.

Delve, "BT's WDM Trail–Integrating WDM Into an Existing Network," IEE Colloqium On Multiwavelength Optical Networks: Devices, Systems and Network Implementations (Ref. No. 1998/257), 1998, pp. 13/1–13/4.

Desurvire, "Erbium–Doped Fiber Amplifiers," Wiley–Interscience, 1994, pp. xx, xxii, 307, and 469–480.

Dono et al., "A Wavelength Division Multiple Access Network for Computer Communication," IEEE Journal on Selected Areas in Communication, vol. 8, No. 6, Aug. 1990, pp. 983–994.

Eaves et al., "An Overview of Emerging ITU–T Recommendations for the Synchronous Digital Hierarchy: Rates and Formats, Network Elements, Line Systems, and Network Aspects," SDH/SONET: A Sourcebook of Synchronous Networking, Siller, Jr. & Shafi, eds., IEEE Press, 1996, pp. 39–46.

Eaves, "Overhead Implementation Alternatives," Lightwave Online, Jan. 31, 1999, pp. 1–2.

Ehrhardt et al., "Testbed for WDM Field Trials Over 750 km with Full Compensation of Chromatic Dispersion," IEE Colloquium on High Speed and Long Distance Transmission (Ref. No. 1999/022), 1999, pp. 5/1–5/5.

Emmett, "Fiber Exhaust Spreads from Long–Distance Market—Wave Division Technology Laps at Local Stores," InternetWeek, Manhasset, Issue 709, Apr. 6, 1998, 4 pages.

Errata Sheet for Transcript of Ornan Gerstel Deposition held on May 13, 2010, 1 page.

Exhibit 1 through Exhibit 8 of Counterclaim Defendant Tellabs, Inc.'s Amended Answer and Counterclaims Against Defendant Fujitsu Limited, *Tellabs Operations, Inc. v. Fujitsu Limited and Fujitsu Network Communications, Inc.,* Civil Action No. 08 CV 3379, Docket No. 121–1 through 121–8, Apr. 2, 2009, 183 pages.

Exhibit 1 through Exhibit 8 of Plaintiff Tellabs, Operations Inc.'s Amended Counterclaims and Reply to Counterclaims Against Defendant Fujitsu Limited, *Tellabs Operations, Inc. v. Fujitsu Limited and Fujitsu Network Communications, Inc.,* Civil Action No. 08 CV 3379, Docket No. 122–1 through 122–8, Apr. 2, 2009, 183 pages.

Exhibit 13 through Exhibit 23 of Declaration of Mark Dodd, *Tellabs Operations, Inc. v. Fujitsu Limited and Fujitsu Network Communications, Inc.,* Civil Action No. 08 CV 3379, Docket No. 322–1/2 Jul. 20, 2010, 173 pages.

Exhibit 18 of Declaration of Mark Dodd (Filed Under Seal), *Tellabs Operations, Inc. v. Fujitsu Limited and Fujitsu Network Communications, Inc.,* Civil Action No. 08 CV 3379, Docket No. 323–1 Jul. 20, 2010, 29 pages.

Exhibit 210 of Ornan Gerstel Redacted Deposition conducted on May 13, 2010, *Tellabs Operations, Inc. v. Fujitsu Limited and Fujitsu Network Communications, Inc.,* Civil Action No. 08 CV 3379, 13 pages.

Exhibit 211 of Ornan Gerstel Redacted Deposition conducted on May 13, 2010, *Tellabs Operations, Inc. v. Fujitsu Limited and Fujitsu Network Communications, Inc.,* Civil Action No. 08 CV 3379, 3 pages.

Exhibit 212 of Ornan Gerstel Redacted Deposition conducted on May 13, 2010, *Tellabs Operations, Inc. v. Fujitsu Limited and Fujitsu Network Communications, Inc.,* Civil Action No. 08 CV 3379, 13 pages.

Exhibit 213 of Ornan Gerstel Redacted Deposition conducted on May 13, 2010, *Tellabs Operations, Inc. v. Fujitsu Limited and Fujitsu Network Communications, Inc.,* Civil Action No. 08 CV 3379, 7 pages.

Exhibit 214 of Ornan Gerstel Redacted Deposition conducted on May 13, 2010, *Tellabs Operations, Inc. v. Fujitsu Limited and Fujitsu Network Communications, Inc.,* Civil Action No. 08 CV 3379, 7 pages.

Exhibit 23 through Exhibit 34 of Declaration of Mark Dodd, *Tellabs Operations, Inc. v. Fujitsu Limited and Fujitsu Network Communications, Inc.,* Civil Action No. 08 CV 3379, Docket No. 322–3, Jul. 20, 2010, 105 pages.

Exhibit 27 of Declaration of Mark Dodd (Filed Under Seal), *Tellabs Operations, Inc. v. Fujitsu Limited and Fujitsu Network Communications, Inc.,* Civil Action No. 08 CV 3379, Docket No. 323–2, Jul. 20, 2010, 10 pages.

Exhibit 3 through Exhibit 5 of Declaration of Kim A. Winick, *Tellabs Operations, Inc., v. Fujitsu Limited and Fujitsu Network Communications, Inc.,* Civil Action No. 08 CV 3379, Docket No. 322–6, Jul. 20, 2010, 61 pages.

Exhibit 35 through Exhibit 42 of Declaration of Mark Dodd, *Tellabs Operations, Inc. v. Fujitsu Limited and Fujitsu Network Communications, Inc.,* Civil Action No. 08 CV 3379, Docket No. 322–4, Jul. 20, 2010, 98 pages.

Exhibit 43 Redacted Deposition of Rajiv Ramaswami, Ph.D. conducted on Jul. 10, 2009, *Tellabs Operations, Inc. v. Fujitsu Limited and Fujitsu Network Communications, Inc.,* Civil Action No. 08 CV 3379, 5 pages.

Exhibit 44 of Redacted Deposition of Rajiv Ramaswami, Ph.D. conducted on Jul. 10, 2009, *Tellabs Operations, Inc. v. Fujitsu Limited and Fujitsu Network Communications, Inc.,* Civil Action No. 08 CV 3379, 32 pages.

Exhibit 45 of Redacted Deposition of Rajiv Ramaswami, Ph.D. conducted on Jul. 10, 2009, *Tellabs Operations, Inc. v. Fujitsu Limited and Fujitsu Network Communications, Inc.,* Civil Action No. 08 CV 3379, 14 pages.

Exhibit 46 of Redacted Deposition of Rajiv Ramaswami, Ph.D. conducted on Jul. 10, 2009, *Tellabs Operations, Inc. v. Fujitsu Limited and Fujitsu Network Communications, Inc.,* Civil Action No. 08 CV 3379, 18 pages.

Exhibit 47 of Redacted Deposition of Rajiv Ramaswami, Ph.D. conducted on Jul. 10, 2009, *Tellabs Operations, Inc. v. Fujitsu Limited and Fujitsu Network Communications, Inc.,* Civil Action No. 08 CV 3379, 24 pages.

Exhibit 48 of Redacted Deposition of Rajiv Ramaswami, Ph.D. conducted on Jul. 10, 2009, *Tellabs Operations, Inc. v. Fujitsu Limited and Fujitsu Network Communications, Inc.,* Civil Action No. 08 CV 3379, 25 pages.

Exhibit 49 of Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 35 pages.

Exhibit 50 of Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 26 pages.

Exhibit 51 of Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 36 pages.

Exhibit 52 of Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 250 pages.

Exhibit 53 of Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 13 pages.

Exhibit 54 of Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 3 pages.

Exhibit 55 of Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 3 pages.

Exhibit 56 of Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 4 pages.

Exhibit 57 of Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 4 pages.

Exhibit 58 of Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 3 pages.

Exhibit 59 of Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 10 pages.

Exhibit 60 of Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 21 pages.

Exhibit 61 of Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 25 pages.

Exhibit 63 of Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 7 pages.

Exhibit 64 of Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 11 pages.

Exhibit 66 of Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 111 pages.

Exhibit A of Tellabs Operations, Inc. and Tellabs, Inc., and Tellabs North America, Inc.'s Submission of Extrinsic Evidence for Claim Construction, *Tellabs Operations, Inc.* v. *Fujitsu Limited and Fujitsu Network Communications, Inc.*, Civil Action No. 08 CV 3379, Docket No. 153exA, Jun. 16, 2009, 18 pages.

Exhibit A of Tellabs' Proposed Terms For Claim Construction and Supporting Intrinsic Evidence, *Tellabs Operations, Inc.* v. *Fujitsu Limited and Fujitsu Network Communications, Inc.*, Civil Action No. 08 CV 3379, Docket No. 89exA, Dec. 22, 2008, 8 pages.

Exhibit A through Exhibit C of Fujitsu Limited is and Fujitsu Network Communications, Inc.'s Motion for Leave to File Amended Preliminary Invalidity Contentions, *Tellabs Operations, Inc.* v. *Fujitsu Limited and Fujitsu Network Communications, Inc.*, Civil Action No. 08 CV 3379, Docket No. 137A through 137C, May 4, 2009, 161 pages.

Exhibit A through Exhibit R of Defendant Fujitsu Network Communications, Inc.'s Amended Answer and Affirmative Defenses to Plaintiff's Complaint and Defendants Fujitsu Network Communications, Inc.'s Amended Counterclaims Against Plaintiff, *Tellabs Operations, Inc.* v. *Fujitsu Limited and Fujitsu Network Communications, Inc.*, Civil Action No. 08 CV 3379, Docket No. 120A through 120R, Apr. 1, 2009, 414 pages.

Exhibit A through Exhibit T of Fujitsu Limited's Amended Answer and Affirmative Defenses to Plaintiff's Complaint and Defendant Fujitsu Limited's Amended Counterclaims Against Plaintiff, *Tellabs, Inc. and Tellabs North America, Inc., Tellabs Operations, Inc.,* v. *Fujitsu Limited and Fujitsu Network Communications, Inc.*, Civil Action No. 08 CV 3379, Docket No. 119A through 119T, Apr. 1, 2009, 490 pages.

Exhibit A–1 through Exhibit A–4 of Defandant Fujitsu Limited's and Fujitsu Network Communications, Inc.'s Opening Claim Construction Brief Addressing Claim Terms of Tellabs' Patent No. 7,369,772, *Tellabs Operations, Inc.* v. *Fujitsu Limited and Fujitsu Network Communications, Inc.*, Civil Action No. 08 CV 3379, Docket No. 298–1, Jun. 15, 2010, 86 pages.

Exhibit A1 through Exhibit A20 of Tellabs Operations, Inc., and Tellabs, Inc. and Tellabs North America, Inc.'s Submission of Extrinsic Evidence for Claim Construction, *Tellabs Operations, Inc.* v. *Fujitsu Limited and Fujitsu Network Communications, Inc.*, Civil Action No. 08 CV 3379, Docket No. 153exA1 through 153ex20, Jun. 16, 2009, 157 pages.

Exhibit A–5 through Exhibit B–4 of Defendant Fujitsu Limited's and Fujitsu Network Communications, Inc.'s Opening Claim Construction Brief Addressing Claim Terms of Tellabs' Patent No. 7,369,772, *Tellabs Operations, Inc.* v. *Fujitsu Limited and Fujitsu Network Communications, Inc.*, Civil Action No. 08 CV 3379, Docket No. 298–2, Jun. 15, 2010, 208 pages.

Exhibit B of Fujitsu Limited and Fujitsu Network Communications, Inc.'s Supplemental Preliminary Rebuttal Claim Construction Submission Based Only on Intrinsic Evidence, *Tellabs Operations, Inc.* v. *Fujitsu Limited and Fujitsu Network Communications, Inc.*, Civil Action No. 08 CV 3379, Docket No. 127exB, Apr. 10, 2009, 42 pages.

Exhibit B of Tellabs Operations, Inc.'s First Supplemental Preliminary Infringement Contentions, *Tellabs Operations, Inc.* v. *Fujitsu Limited and Fujitsu Network Communications, Inc.*, Civil Action No. 08 CV 3379, Jun. 4, 2009, 194 pages.

Exhibit B of Tellabs' Response to Fujitsu Limited and Fujitsu Network Communications, Inc.'s Preliminary Claim Constructions Based on Intrinsic Evidence Submitted Dec. 22, 2008, *Tellabs Operations, Inc.* v. *Fujitsu Limited and Fujitsu Network Communications, Inc.*, Civil Action No. 08 CV 3379, Docket No. 91exB, Jan. 15, 2009, 4 pages.

Exhibit B of Tellabs' Proposed Terms For Claim Construction and Supporting Intrinsic Evidence, *Tellabs Operations, Inc.* v. *Fujitsu Limited and Fujitsu Network Communications, Inc.*, Civil Action No. 08 CV 3379, Docket No. 89exB, Dec. 22, 2008, 5 pages.

Exhibit B–11 of Defendant Fujitsu Limited's and Fujitsu Network Communications, Inc.'s Opening Claim Construction Brief Addressing Claim Terms of Tellabs' Patent 7,369,772, *Tellabs Operations, Inc.* v. *Fujitsu Limited and Fujitsu Network Communications, Inc.*, Civil Action No. 08 CV 3379, Docket No. 298–4, Jun. 15, 2010, 71 pages.

Exhibit B–12 through Exhibit B–14 of Defendant Fujitsu Limited's and Fujitsu Network Communications, Inc.'s Opening Claim Construction Brief Addressing Claim Terms of Tellabs' Patent 7,369,772, *Tellabs Operations, Inc.* v. *Fujitsu Limited and Fujitsu Network Communications, Inc.*, Civil Action No. 08 CV 3379, Docket No. 298–5, Jun. 15, 2010, 61 pages.

Exhibit B–15 (cont'd) through Exhibit B–19 of Defendant Fujitsu Limited's and Fujitsu Network Communications, Inc.'s Opening Claim Construction Brief Addressing Claim Terms of Tellabs' Patent 7,369,772, *Tellabs Operations, Inc.* v. *Fujitsu Limited and Fujitsu Network Communications, Inc.*, Civil Action No. 08 CV 3379, Docket No. 298–7, Jun. 15, 2010, 68 pages.

Exhibit B–15 of Defendant Fujitsu Limited's and Fujitsu Network Communications, Inc.'s Opening Claim Construction Brief Addressing Claim Terms of Tellabs' Patent 7,369,772, *Tellabs Operations, Inc.* v. *Fujitsu Limited and Fujitsu Network Communications, Inc.*, Civil Action No. 08 CV 3379, Docket No. 298–6, Jun. 15, 2010, 17 pages.

Exhibit B–18 (Table of Contents Redaction) of Defendant Fujitsu Limited's and Fujitsu Network Communications, Inc.'s Opening Claim Construction Brief Addressing Claim Terms of Tellabs' Patent 7,369,772 (Filed Under Seal), *Tellabs Operations, Inc.* v. *Fujitsu Limited and Fujitsu Network Communications, Inc.*, Civil Action No. 08 CV 3379, Docket No. 298–7, Jun. 15, 2010, 17 pages.

Exhibit B–20 through Ex. B–25 of Defendant Fujitsu Limited's and Fujitsu Network Communications, Inc.'s Opening Claim Construction Brief Addressing Claim Terms of Tellabs' Patent 7,369,772, *Tellabs Operations, Inc.* v. *Fujitsu Limited and Fujitsu Network Communications, Inc.*, Civil Action No. 08 CV 3379, Docket No. 298–8, Jun. 15, 2010, 126 pages.

Exhibit B–26, B–29 through B–33, B35 through B–37, C–1 and C–2 of Fujitsu's Reply Brief Re Construction of Claim Terms in Tellab's U.S. Patent No. 7,369,772, *Tellabs Operations, Inc.* v. *Fujitsu Limited and Fujitsu Network Communications, Inc.*, Civil Action No. 08 CV 3379, Docket No. 335–1, Aug. 10, 2010, 151 pages.

Exhibit B–27 of Fujitsu's Reply Brief Re Construction of Claim Terms in Tellabs' U.S. Patent No. 7,369,772 (Filed Under Seal), *Tellabs Operations, Inc.* v. *Fujitsu Limited and Fujitsu Network Communications, Inc.*, Civil Action No. 08 CV 3379, Docket No. 335–1, Aug. 10, 2010, 19 pages.

Exhibits B–28 (Redaction on p. 19 of the PDF file) of Fujitsu's Reply Brief Re Construction of Claim Terms in Tellabs' U.S. Patent 7,369,772, *Tellabs Operations, Inc.* v. *Fujitsu Limited and Fujitsu Network Communications, Inc.*, Civil Action No. 08 CV 3379, Docket No. 335–1, Aug. 10, 2010, 19 pages.

Exhibit B–34 (Table of Contents Redaction) of Fujitsu's Reply Brief Re Construction of Claim Terms of Tellabs' U.S. Patent No. 7,369,772 (Filed Under Seal), *Tellabs Operations, Inc.* v. *Fujitsu Limited and Fujitsu Network Communications, Inc.*, Civil Action No. 08 CV 3379, Docket No. 335–1, Aug. 10, 2010, 18 pages.

Exhibit B–5 (Table of Contents Redaction) of Defendant Fujitsu Limited's and Fujitsu Network Communications, Inc.'s Opening Claim Construction Brief Addressing Claim Terms of Tellabs' Patent 7,369,772 (Filed Under Seal), *Tellabs Operations, Inc.* v. *Fujitsu Limited and Fujitsu Network Communications, Inc.*, Civil Action No. 08 CV 3379, Docket No. 298–3, Jun. 15, 2010, 34 pages.

Exhibit B–5 through Exhibit B–10 of Defendant Fujitsu Limited's and Fujitsu Network Communications, Inc.'s Opening Claim Construction Brief Addressing Claim Terms of Tellabs' Patent 7,369,772, *Tellabs Operations, Inc.* v. *Fujitsu Limited and Fujitsu Network Communications, Inc.*, Civil Action No. 08 CV 3379, Docket No. 298–3, Jun. 15, 2010, 54 pages.

Exhibit C (With sub–exhibits) (Redacted) of Fujitsu Limited's and Fujitsu Network Communications, Inc.'s Preliminary Identification of Extrinsic Evidence for Claim Construction, *Tellabs Operations, Inc.* v. *Fujitsu Limited and Fujitsu Network Communications, Inc.*, Civil Action No. 08 CV 3379, Docket No. 166exC, Jun. 16, 2009, 245 pages.

Exhibit C of Defendant Fujitsu Limited's and Fujitsu Network Communications, Inc.'s Opening Claim Construction Brief Addressing Claim Terms of Tellabs' Patent 7,369,772, *Tellabs Operations, Inc.* v. *Fujitsu Limited and Fujitsu Network Communications, Inc.*, Civil Action No. 08 CV 3379, Docket No. 298–9, Jun. 15, 2010, 452 pages.

Exhibit C of Fujitsu Limited and Fujitsu Network Communications, Inc.'s Preliminary Claim Constructions Based Solely on Intrinsic Evidence, *Tellabs Operations, Inc.* v. *Fujitsu Limited and Fujitsu Network Communications, Inc.*, Civil Action No. 08 CV 3379, Docket No. 90exC, Dec. 22, 2008, 30 pages.

Exhibit C of Tellabs' Response to Fujitsu Limited and Fujitsu Network Communications, Inc.'s Preliminary Claim Constructions Based on Intrinsic Evidence Submitted Dec. 22, 2008, *Tellabs Operations, Inc.* v. *Fujitsu Limited and Fujitsu Network Communications, Inc.*, Civil Action No. 08 CV 3379, Docket No. 91exC, Jan. 15, 2009, 5 pages.

Exhibit CAO–A of Fujitsu Limited's Request For Ex Parte Reexamination of U.S. Patent No. 7,369,772, Reexamination Control No. 90/010,763, Fujitsu Limited, Dec. 9, 2009, 4 pages.

Exhibit CAO–B of Fujitsu Limited's Request For Ex Parte Reexamination of U.S. Patent No. 7,369,772, Reexamination Control No. 90/010,763, Fujitsu Limited, Dec. 9, 2009, 5 pages.

Exhibit CAO–C of Fujitsu Limited's Request For Ex Parte Reexamination of U.S. Patent No. 7,369,772, Reexamination Control No. 90/010,763, Fujitsu Limited, Dec. 9, 2009, 8 pages.

Exhibit CAO–D of Fujitsu Limited's Request For Ex Parte Reexamination of U.S. Patent No. 7,369,772, Reexamination Control No. 90/010,763, Fujitsu Limited, Dec. 9, 2009, 7 pages.

Exhibit CAO–E of Fujitsu Limited's Request For Ex Parte Reexamination of U.S. Patent No. 7,369,772, Reexamination Control No. 90/010,763, Fujitsu Limited, Dec. 9, 2009, 8 pages.

Exhibit CC–A of Fujitsu Limited's Request For Ex Parte Reexamination of U.S. Patent No. 7,369,772, Reexamination Control No. 90/010,763, Fujitsu Limited, Dec. 9, 2009, 100 pages.

Exhibit CC–B of Fujitsu Limited's Request For Ex Parte Reexamination of U.S. Patent No. 7,369,772, Reexamination Control No. 90/010,763, Fujitsu Limited, Dec. 9, 2009, 106 pages.

Exhibit DECL–A of Fujitsu Limited's Request For Ex Parte Reexamination of U.S. Patent No. 7,369,772, Reexamination Control No. 90/010,763, Alan E. Willner, Dec. 4, 2009, 94 pages.

Exhibit GREEN–A of Fujitsu Limited's Request For Ex Parte Reexamination of U.S. Patent No. 7,369,772, Reexamination Control No. 90/010,763, Fujitsu Limited, Dec. 9, 2009, 2 pages.

Exhibit GREEN–B of Fujitsu Limited's Request For Ex Parte Reexamination of U.S. Patent No. 7,369,772, Reexamination Control No. 90/010,763, Fujitsu Limited, Dec. 9, 2009, 5 pages.

Exhibit GREEN–C of Fujitsu Limited's Request For Ex Parte Reexamination of U.S. Patent No. 7,369,772, Reexamination Control No. 90/010,763, Fujitsu Limited, Dec. 9, 2009, 6 pages.

Exhibit GREEN–D of Fujitsu Limited's Request For Ex Parte Reexamination of U.S. Patent No. 7,369,772, Reexamination Control No. 90/010,763, Fujitsu Limited, Dec. 9, 2009, 6 pages.

Exhibit GREEN–E of Fujitsu Limited's Request For Ex Parte Reexamination of U.S. Patent No. 7,369,772, Reexamination Control No. 90/010,763, Fujitsu Limited, Dec. 9, 2009, 6 pages.

Exhibit GREEN–F of Fujitsu Limited's Request For Ex Parte Reexamination of U.S. Patent No. 7,369,772, Reexamination Control No. 90/010,763, Fujitsu Limited, Dec. 9, 2009, 6 pages.

Exhibit GREEN–G of Fujitsu Limited's Request For Ex Parte Reexamination of U.S. Patent No. 7,369,772, Reexamination Control No. 90/010,763, Fujitsu Limited, Dec. 9, 2009, 5 pages.

Exhibit GREEN–H of Fujitsu Limited's Request For Ex Parte Reexamination of U.S. Patent No. 7,369,772, Reexamination Control No. 90/010,763, Fujitsu Limited, Dec. 9, 2009, 6 pages.

Exhibit GREEN–I of Fujitsu Limited's Request For Ex Parte Reexamination of U.S. Patent No. 7,369,772, Reexamination Control No. 90/010,763, Fujitsu Limited, Dec. 9, 2009, 6 pages.

Exhibit GREEN–J of Fujitsu Limited's Request For Ex Parte Reexamination of U.S. Patent No. 7,369,772, Reexamination Control No. 90/010,763, Fujitsu Limited, Dec. 9, 2009, 6 pages.

Final Office Action of Oct. 26, 2009 in U.S. Appl. No. 12/042,793, which is a continuation of the '772 patent, 8 pages.

Ford et al., "MEMS Wavelength Add/Drop Switch," Lucent Technologies Bell Labs Innovations, 11 pages.

Ford et al., "Wavelength Add/Drop Switching Using Tilting Micromirrors," Journal of Lightwave Technology, vol. 17, No. 5, May 1999, pp. 904–911.

Ford et al., "Wavelength–Selectable Add/Drop With Tilting Micromirrors," LEOS, Nov. 10–13, 1997, 3 pages.

Fujitsu Limited and Fujitsu Network Communications, Inc.'s Preliminary Claim Construction Based Only on Intrinsic Evidence, *Tellabs Operations, Inc. v. Fujitsu Limited and Fujitsu Network Communications, Inc.*, Civil Action No. 08 CV 3379, Docket No. 90, Dec. 22, 2008, 4 pages.

Fujitsu Limited and Fujitsu Network Communications, Inc.'s Preliminary Rubuttal Claim Construction Submission Based Only on Intrinsic Evidence, *Tellabs Operations, Inc. v. Fujitsu Limited and Fujitsu Network Communications, Inc.*, Civil Action No. 08 CV 3379, Docket No. 92, Jan. 15, 2009, 6 pages.

Fujitsu Limited and Fujitsu Network Communications, Inc.'s Supplemental Primary Rebuttal Claim Construction Submission Based Only on Intrinsic Evidence, *Tellabs Operations, Inc. v. Fujitsu Limited and Fujitsu Network Communications, Inc.*, Civil Action No. 08 CV 3379, Docket No. 127, Apr. 10, 2009, 6 pages.

Fujitsu Limited's and Fujitsu Network Communications, Inc.'s Motion for Leave to File Amended Preliminary Invalidity Contentions, *Tellabs Operations, Inc. v. Fujitsu Limited and Fujitsu Network Communications, Inc.*, Civil Action No. 08 CV 3379, Docket No. 137, May 4, 2009, 6 pages.

Fujitsu Limited's and Fujitsu Network Communications, Inc.'s Preliminary Identification Extrinsic of Evidence for Claim Construction, *Tellabs Operations, Inc. v. Fujitsu Limited and Fujitsu Network Communications, Inc.*, Civil Action No. 08 CV 3379, Docket No. 166, Jun. 16, 2009, 5 pages.

Exhibits in Support of Fujitsu's Rebuttal Presentation for the '772 Patent, Dec. 3, 2010, 45 pages.

Fujitsu's Proposed Claim Constructions for the Parties' May 12, 2010 Exchange, *Tellabs Operations, Inc. v. Fujitsu Limited and Fujitsu Network Communications, Inc.*, Civil Action No. 08 CV 3379, 10 pages.

Fujitsu's Rebuttal Markman Presentation for U.S. Patent No. 7,369,772, Dec. 3, 2010, 98 pages.

Fujitsu's Reply Brief Re Construction of Claim Terms in Tellabs' U.S. Patent No. 7,369,772, (Confidential Version Filed Under Seal), *Tellabs Operations, Inc. v. Fujitsu Limited and Fujitsu Network Communications, Inc.*, Civil Action No. 08 CV 3379, Docket No. 335, Aug. 10, 2010, 70 pages.

Fujitsu's Surrebuttal Markman Slides for U.S. Patent No. 7,369,772, Dec. 7, 2010, 36 pages.

Fujitsu's Preliminary Invalidity Contentions for the '772 Patent–Exhibit A4(A), The "Chang" Reference, *Tellabs Operations, Inc. v. Fujitsu Limited and Fujitsu Network Communications, Inc.*, Civil Action No. 08 CV 3379, Docket No. 90, Feb. 27, 2009, 43 pages.

Fujitsu's Preliminary Invalidity Contentions for the '772 Patent–Amended Exhibit A3, U.S. Pat. No. 6,169,616, *Tellabs Operations, Inc.* v. *Fujitsu Limited and Fujitsu Network Communications, Inc.*, Civil Action No. 08 CV 3379, May 4, 2009, 47 pages.

Fujitsu's Preliminary Invalidity Contentions for the '772 Patent–Amended Exhibit A9, The "Caenegem" Reference, *Tellabs Operations, Inc.* v. *Fujitsu Limited and Fujitsu Network Communications, Inc.*, Civil Action No. 08 CV 3379, May 4, 2009, 42 pages.

Fujitsu's Preliminary Invalidity Contentions for the '772 Patent–Exhibit A 11, U.S. Pat. No. 6,545,783, *Tellabs Operations, Inc.* v. *Fujitsu Limited and Fujitsu Network Communications, Inc.*, Civil Action No. 08 CV 3379, Feb. 27, 2009, 42 pages.

Fujitsu's Preliminary Invalidity Contentions for the '772 Patent–Exhibit A1, U.S. Pat. No. 6,333,799, *Tellabs Operations, Inc.* v. *Fujitsu Limited and Fujitsu Network Communications, Inc.*, Civil Action No. 08 CV 3379, Feb. 27, 2009, 35 pages.

Fujitsu's Preliminary Invalidity Contentions for the '772 Patent–Exhibit A10, The "Wagner" Reference, *Tellabs Operations, Inc.* v. *Fujitsu Limited and Fujitsu Network Communications, Inc.*, Civil Action No. 08 CV 3379, Feb. 27, 2009, 6 pages.

Fujitsu's Preliminary Invalidity Contentions for the '772 Patent–Exhibit A2, U.S. Pat. No. 5,930,016, *Tellabs Operations, Inc.* v. *Fujitsu Limited and Fujitsu Network Communications, Inc.*, Civil Action No. 08 CV 3379, Feb. 27, 2009, 45 pages.

Fujitsu's Preliminary Invalidity Contentions for the '772 Patent–Exhibit A3, U.S. Pat. No. 6,169,616, *Tellabs Operations, Inc.* v. *Fujitsu Limited and Fujitsu Network Communications, Inc.*, Civil Action No. 08 CV 3379, Feb. 27, 2009, 44 pages.

Fujitsu's Preliminary Invalidity Contentions for the '772 Patent–Exhibit A4(B), The "Chang" Reference, *Tellabs Operations, Inc.* v. *Fujitsu Limited and Fujitsu Network Communications, Inc.*, Civil Action No. 08 CV 3379, Feb. 27, 2009, 40 pages.

Fujitsu's Preliminary Invalidity Contentions for the '772 Patent–Exhibit A5, U.S. Pat. No. 6,134,047, *Tellabs Operations, Inc.* v. *Fujitsu Limited and Fujitsu Network Communications, Inc.*, Civil Action No. 08 CV 3379, Feb. 27, 2009, 42 pages.

Fujitsu's Preliminary Invalidity Contentions for the '772 Patent–Exhibit A6, The "Gerstel" Reference, *Tellabs Operations, Inc.* v. *Fujitsu Limited and Fujitsu Network Communications, Inc.*, Civil Action No. 08 CV 3379, Feb. 27, 2009, 44 pages.

Fujitsu's Preliminary Invalidity Contentions for the '772 Patent–Exhibit A7(A) U.S. Pat. No. 6,426,815, *Tellabs Operations, Inc.* v. *Fujitsu Limited and Fujitsu Network Communications, Inc.*, Civil Action No. 08 CV 3379, Feb. 27, 2009, 38 pages.

Fujitsu's Preliminary Invalidity Contentions for the '772 Patent–Exhibit A7(B), U.S. Pat. No. 6,426,815, *Tellabs Operations, Inc.* v. *Fujitsu Limited and Fujitsu Network Communications, Inc.*, Civil Action No. 08 CV 3379, Feb. 27, 2009, 39 pages.

Fujitsu's Preliminary Invalidity Contentions for the '772 Patent–Exhibit A8, U.S. Pat. No. 6,233074, *Tellabs Operations, Inc.* v. *Fujitsu Limited and Fujitsu Network Communications, Inc.*, Civil Action No. 08 CV 3379, Feb. 27, 2009, 41 pages.

Fujitsu's Preliminary Invalidity Contentions for the '772 Patent–Exhibit A9, The "Caenegem" Reference, *Tellabs Operations, Inc.* v. *Fujitsu Limited and Fujitsu Network Communications, Inc.*, Civil Action No. 08 CV 3379, Feb. 27, 2009, 42 pages.

Gaudino et al., "Remote Provisioning of A Reconfigurable WDM Multichannel Add/Drop Multiplexer," IEEE Photonics Technology Letters, vol. 11, No. 8, Aug. 1999, pp. 1060–1062.

Gerstel et al., "Fault Tolerant Multiwavelength Optical Rings with Limited Wavelength Conversion," IEEE Journal on Selected Areas in Communications, vol. 16, No. 7, Sep. 1998, pp. 1166–1178.

Gerstel et al., "Upgrading Sonet Rings with WDM Instead of TDM: An Economic Analysis," OFC/IOOC '99 Technical Digest, Feb. 21–26, 1999, pp. 75–77.

Gerstel et al., "Making Use of a Two Stage Multiplexing Scheme in a WDM Network," 2000, pp. 44–46.

Gerstel et al., "Benefits of Limited Wavelength Conversion in WDM Ring Networks," OFC '97 Technical Digest, Feb. 16–21, 1997, pp. 119 and 120.

Gerstel et al., "Combined WDM and Sonet Network Design," Proceedings IEEE Infocom '99, vol. 2, Mar. 21–25, 2009, pp. 734–743, Attached as Exhibit O, Civil Action No. 08 CV 3379, Mar. 26, 2009.

Gerstel et al., "Cost Effective Traffic Grooming in WDM Rings," IEEE Infocom, San Francisco, Mar. 29–Apr. 2, 1998, pp. 69–77.

Gerstel, "On The Future of Wavelength Routing Networks," IEEE Network, vol. 10, No. 6, 1996, pp. 14–20.

Goldstein et al., "Optical Networking Visions," Optical Society of America Technical Digest, 1999, pp. 275–278.

Gottieb et al., "Monet WDM Network Elements," IEEE Mil. Comm. Conf. Proc., Oct./Nov. 1999, pp. 963–967.

Green Jr., "Fiber Optic Networks," Prentice–Hall Inc., 1993, 527 pages.

Hayee et al., "Transmission Penalties Due to EDFA Gain Transients in Add–Drop Multiplexed WDM Networks," IEEE Photonics Technology Letters, vol. 11, No. 7, Jul. 1999, pp. 889–891.

Hecht, "Long–Haul DWDM Systems Go the Distance," Laser Focus World, Oct. 2000, pp. 125–132.

Hecht, "Planned Super–Internet Banks on Wavelength–Division Multiplexing," Laser Focus World, May 1998, pp. 103–105.

Hecht, "Wavelength Division Multiplexing," Technology Review, 1999, pp. 73–77.

Henry, "Lightwave Primer," IEEE Journal of Quantum Electronics, vol. QE–21, No. 12, Dec. 1985, pp. 1862–1879.

Hill et al., "A Transport Network Layer Based on Optical Nework Elements," Journal of Lightwave Technology, vol. 11, No. 5/6, May/Jun. 1993, pp. 667–679.

Hjelme et al., "Reconfigurable All–fiber All–optical Cross–connect Node Using Synthesized Fiber Bragg Gratings for Both Demultiplexing and Switching," OFC '98 Technical Digest, 1998, pp. 65–66.

Ho et al., "Eight–Channel Bidirectional WDM Add/Drop Multiplexer," Electronics Letters, vol. 34, No. 10, 1998, pp. 947 and 948.

Ho et al., "Performance of An Eight–wavelength Bidirectional WDM Add/Drop Multiplexer with 80–Gbit/s Capacity," OCF 97 Technical Digest, Feb. 16–21, 1997, pp. 90–91.

Hofmeister et al., "Project LEARN—Light Exchangeable, Add/Drop Ring Network," Proceedings of Optical Fiber Comm. Conf., 1997, pp. 467–470.

Janniello et al., "Multiplex–protocol Optical–fiber Multiplexer for Remote Computer Interconnection," Optical Fiber Communications Conference, OSA Technical Digest Series, vol. 8, 1995, pp. WO1, 6 pages.

JDS Fitel Datasheet for WD1508 M2/D2 Series 8 Channel 200 Ghz Spaced ITU–WDM Multiplexers/Demultiplexers (2 pages).

Jerominek et al., "Optical Branching Effect in Ti:LiNbO3 Waveguides: Near–Field Pattern Studies," Applied Optics, vol. 25, 1986, pp. 732–736.

Jourdan et al., "Design and Implementation of a Fully Reconfigurable All–optical Crossconnect for High Capacity Multiwavelength Transport Networks," Journal of Lightwave Technology, vol. 14, No. 6, 1996, pp. 1198–1206.

Kaminow et al., "Chapter 15: Advanced Multiaccess Lightwave Networks," Optical Fiber Telecommunications IIIA, Academic Press, 1997, pp. 560–593.

Kaminow et al., "Chapter 10: Undersea Amplified Lightwave System Design," Optical Fiber Telecommunications IIIA, Academic Press, 1997, pp. 302–335 and 464–489.

Karasan et al., "Optical Restoration at the Wavelength–multiplex Section Level in WDM Mesh Networks," IEEE Photonics Technology Letters, vol. 10, No. 9, 1998, pp. 1343–1345.

Kawai et al., "Crosstalk Reduction in NxN WDM Multi/Demultiplexers by Cascading Small Arrayed Waveguide Gratins (AWG's)," Journal of Lightwave Technology, vol. 15, No. 10, 1997, pp. 1929–1937.

Kawai et al., "Design of A Large Scale Optical Wavelength Routing Circuit," Proceedings of the 1995 Communications Society Conference of IEICE, B–705, p. 372.

Kojucharow et al., "A Wireless LAN at 60 GHz—Novel System Design and Transmission Experiments," IEEE MTT–S International Microwave Symposium Digest, 1998, pp. 1513–1516.

Lin et al., "Layered Switch Architectures for High–capacity Optical Fiber Communications," ECOC '97, vol. 2, No. 448, Sep. 22–25, 1997, pp. 249–252.

Lin et al., "Micromachined Optical–Switching Technologies for WDM Networks," IEEE LEOS Summer Topical Meetings, Jul. 1999, pp. 57–58.

MacDonald et al., "Optoelectronic Switching: Technology and Architecture," Proceedings of SPIE 2918, 1997, pp. 2–13.

McCammon et al., "Deployment of The National Transparent Optical Network Around the San Francisco Bay Area," Lawrence Livermore National Laboratory, 1996, 15 pages.

McGraw–Hill Dictionary of Scientific and Technical Terms, McGraw–Hill, 1989, pp. 144, 152, 425, and 780.

McGreer, "Arrayed Waveguide Gratings for Wavelength Routing," IEEE Communications Magazine, vol. 36, No. 12, 1998, pp. 62–68.

Memorandum Opinion and Order Preliminarily Construing Certain Disputed Claim Terms Based on the Intrinsic Evidence, *Tellabs Operations, Inc.* v. *Fujitsu Limited and Fujitsu Network Communications, Inc.*, Civil Action No. 08 CV 3379, Docket No. 145, May 13, 2009, 40 pages.

Mikkelsen et al., "Impact on Traffic and Transmission Performance of All–optic Wavelength Converters Placed at the Network Interface or in OXCNs," Conference on OFC '97, Feb. 16–21, 1997, pp. 124 and 125.

"Newton's Telecom Dictionary," Telecom Library Inc., 1991, pp. 125, 126, 162, and 498.

Nishio et al., "Photonic Wavelength–Division Switching Network Using A Parallel [lambda]–Switch," Apr. 1990, pp. 286–290.

Nishio, "Photonic Wavelength–Division Switching Network Using A Parallel [lambda]–Switch," Apr. 1990, pp. 286–288 and Figs. 2&3.

Non–Final Office Action of Dec. 29, 2008 in U.S. Appl. No. 12/042,793, which is a continuation of the '772 patent, 5 pages.

Obara et al., "Virtually Crosstalk–free Wavelength Routing Network Architecture," Electronics Letters, vol. 32, No. 12, 1996, pp. 1123–1125.

"Optical Communication Products Launches OC–48 Optical Transponder Product Family," Business Editors, Dec. 20, 2000, 2 pages.

"Optical Communication Technology Presentation For The '772 Patent," *Tellabs Operations, Inc.* v. *Fujitsu Limited and Fujitsu Network Communications, Inc.*, Civil Action No. 08 CV 3379, Docket No. 213, 58 pages.

"Optical Communication Technology Presentation Overview," *Tellabs Operations, Inc.* v. *Fujitsu Limited and Fujitsu Network Communications, Inc.*, Civil Action No. 08 CV 3379, Docket No. 212, 50 pages.

Optical Fiber Communication Conference and the International Conference on Integrated Optics and Optical Fiber Communication, OFC/IOOC '99 Technical Digest Digest, (1999) (Showing the Agenda that Caenegem's Presentation was Scheduled for Presentation at 3:45pm in Room 6D on Tuesday, Feb. 23, 1999), 4 pages.

Optical Fiber Communication Conference and the International Conference on Integrated Optics and Optical Fiber Communication, OFC/IOOC '99 Technical Digest Digest, (1999) (Showing the Agenda that Gerstel and Ramaswami's paper was Scheduled for Presentation at 9:45 am in Room 5A on Thursday, Feb. 25, 1999), 4 pages.

"Optical Networking: Lucent Technologies Announces Optical Transponder Module in Miniature Package for High–Speed Optical Networking System—Product Announcement," Edge, On & About AT&T, Mar. 8, 1999, 2 pages.

Pacer Docket Report of *Tellabs Operations, Inc.* v. *Fujitsu Limited and Fujitsu Network Communications, Inc.*, Civil Action No. 08 CV 3379, Retrieved May 18, 2011, 78 pages.

Order Granting Request for Ex Parte Reexamination of U.S. Patent No. 6,973,229, Reexamination Control No. 90/009,864, Feb. 14, 2011, 16 pages.

Non–final Office Action in Reexamination Control No. 90/009,864, Apr. 28, 2011, 16 pages.

Office Action in EP Patent Application No. 07 796 705.7, Nov. 29, 2010, 5 pages.

Pedersen et al., "WDM Cross–connect Cascade Based on All–optical Wavelength Converters for Routing and Wavelength Slot Interchanging Using A Reduced Number of Internal Wavelengths," OFC '98 Technical Digest, Feb. 22–27, 1998, pp. 58 and 59.

Pedrotti et al., "West 120–Gbit/s 3×3 Wavelength–division Multiplexed Cross–Connect," OFC ʋTechnical Digest, Feb. 22–27, 1998, pp. 66 and 67.

Plaintiff Tellabs, Operations Inc.'s Amended Counterclaims and Reply to Counterclaims Against Defendant Fujitsu Limited, *Tellabs Operations, Inc.* v. *Fujitsu Limited and Fujitsu Network Communications, Inc.*, Civil Action No. 08 CV 3379, Docket No. 122, Apr. 2, 2009, 41 pages.

Presentation by Tellabs for the Claim Construction Hearing for U.S. Patent No. 7,369,772, Nov. 24, 2010, 218 pages.

Ramaswami et al., "Optical Networks: A Practical Perspective," 2nd Edition, 2002, 847 pages.

Ramaswami et al., "Optical Networks: A Practical Perspective," Academic Press, 1998, 642 pages.

Ramaswami et al., "Design of Logical Topologies for Wavelength–Routed Optical Networks," IEEE Journal on Selected Areas in Communications, vol. 14, No. 5, 1996, pp. 840–851.

Ramaswami et al., "Fiber–Optic Networks: Future Trends," Journal of IETE, vol. 39, No. 2, 1993, pp. 59–68.

Ramaswami et al., "Multiwavelength Optical Networks with Limited Wavelength Conversion," IEEE Infocom, vol. 2, 1997, pp. 489–498.

Ramaswami et al., "Routing and Wavelength Assignment in All–Optical Networks," IEEE/ACM Transactions on Networking, vol. 3, No. 5, 1995, pp. 489–500.

Ramaswami, "Multiwavelength Lightwave Networks for Computer Communication," IEEE Communications Magazine, 1993, pp. 78–88.

Ramaswami, "Optical Networking," presentation slides, pp. 1–111.

Redacted Deposition of Rajiv Ramaswami, Ph.D. conducted on Jul. 10, 2009, *Tellabs Operations, Inc.* v. *Fujitsu Limited and Fujitsu Network Communications, Inc.*, Civil Action No. 08 CV 3379, 300 pages.

Redacted Transcript of Ornan Gerstel Deposition conducted on May 13, 2010, *Tellabs Operations, Inc.* v. *Fujitsu Limited and Fujitsu Network Communications, Inc.*, Civil Action No. 08 CV 3379, 249 pages.

Sasaki et al., "A WDM Ring Network for Incremental Traffic," Proceedings Thirty–sixth Annual Allerton Conference on Communication Control and Computing, pp. 662–672.

Shimomura et al., "Wavelength–Division Add/Drop Multiplexer Using a Single Wavelength–Filter and Back–Reflector Switches," OFC '98 Technical Digest, Feb. 22–27, 1998, pp. 80–82.

Sincerbox et al., "Small Fast Large–Aperture Light Modulator Using Attenuated Total Reflection," Applied Optics, vol. 20, No. 8, Apr. 15, 1981, pp. 1491 and 1492.

Singer, "An MLSE Receiver for Electronic Dispersion Compensation of OC–192 Fiber Links," IEEE Journal of Solid–State Circuits, vol. 41, No. 11, Nov. 2006, pp. 2541–2554.

Singer, "Electronic Dispersion Compensation," IEEE Signal Processing Magazine, Nov. 2008, pp. 110–130.

Bae et al., "Fast Power Transient Management for OC–192 WDM Add/Drop Networks," IEEE Journal of Solid–State Circuits, vol. 43, No. 12, Dec. 2008, pp. 2958–2966.

Stern, "Linear Lightwave Networks: How Far Can They Go?," IEEE Globecom '90, 1990, pp. 1866–1872.

Sugaya et al., "Study of Configuration Methods of Multi–Wavelength Er–doped Fiber Amplifiers," The Institute of Electronics, Information and Communication Engineers Technical Report of IEICE OCS95–36, 1995, pp. 1–23 (including translation).

"Supplemental Optical Communication Technology Presentation for the '772 Patent," *Tellabs Operations, Inc.* v. *Fujitsu Limited and Fujitsu Network Communications, Inc.*, Civil Action No. 08 CV 3379,Docket No. 271, Feb. 18, 2010, 34 pages.

Tellabs Operations, Inc. and Tellabs, Inc., and Tellabs North America, Inc.'s Submission of Extrinsic Evidence for Claim Construction, *Tellabs Operations, Inc.* v. *Fujitsu Limited and Fujitsu Network Communications, Inc.*, Civil Action No. 08 CV 3379, Docket No. 153, Jun. 16, 2009, 9 pages.

Tellabs Operations, Inc.'s Disclosure of Asserted Claims and Infringement Contentions (with Exhibit A), *Tellabs Operations, Inc.* v. *Fujitsu Limited and Fujitsu Network Communications, Inc.*, Civil Action No. 08 CV 3379, Nov. 4, 2008, 210 pages.

Tellabs Operations, Inc.'s First Supplemental Preliminary Infringement Contentions, *Tellabs Operations, Inc.* v. *Fujitsu Limited and Fujitsu Network Communications, Inc.*, Civil Action No. 08 CV 3379, Jun. 4, 2009, 5 pages.

Tellabs Proposed Claim Constructions—May 12, 2010 Exchange with Fujitsu, *Tellabs Operations, Inc.* v. *Fujitsu Limited and Fujitsu Network Communications, Inc.*, Civil Action No. 08 CV 3379, 4 pages.

Tellabs' Response to Fujitsu Limited and Fujitsu Network Communications, Inc.'s Preliminary Claim Constructions Based on Intrinsic Evidence Submitted Dec. 22, 2008, *Tellabs Operations, Inc.* v. *Fujitsu Limited and Fujitsu Network Communications, Inc.*, Civil Action No. 08 CV 3379, Docket No. 91, Jan. 15, 2009, 5 pages.

Tellabs' Responsive Brief on Claim Construction (Filed Under Seal), *Tellabs Operations, Inc.* v. *Fujitsu Limited and Fujitsu Network Communications, Inc.*, Civil Action No. 08 CV 3379, Docket No. 323, Jul. 20, 2010, 84 pages.

Tellabs' Operations, Inc., Tellabs, Inc., and Tellabs North America, Inc.'s Responsive Brief on Claim Construction, *Tellabs Operations, Inc.* v. *Fujitsu Limited and Fujitsu Network Communications, Inc.*, Civil Action No. 08 CV 3379, Docket No. 322, Jul. 20, 2010, 84 pages.

Tellabs, Titan 6100 Optical Transport System, Module and Hardware Description, Technical Manual 76.6100/4, Rev. A, 2000, p. 4–31.

Tellabs' Proposed Terms For Claim Construction and Supporting Intrinsic Evidence, *Tellabs Operations, Inc.*, v. *Fujitsu Limited and Fujitsu Network Communications, Inc.*, Civil Action No. 08 CV 3379, Docket No. 89, Dec. 22, 2008, 3 pages.

Tellabs' Supplemental Exhibits for Rebuttal Regarding the Claim Construction Argument for U.S. Patent No. 7,369, 772, Dec. 3, 2010, 30 pages.

"The New IEEE Standard Dictionary of Electrical and Electronics Terms," IEEE, 1993, pp. 62, 64, 260, 263, and 547.

Transcript of Proceedings Held on Feb. 22, 2010, *Tellabs Operations, Inc.* v. *Fujitsu Limited and Fujitsu Network Communications, Inc.*, Civil Action No. 08 CV 3379, Docket No. 286, Feb. 22, 2010, 122 pages.

Tsushima et al., "Optical Cross–connect Systems for Restoration of Backbone Fiber Networks," OFC '98 Technical Digest, Feb. 22–27, 1998, pp. 271 and 272.

Van Caenegem et al., "Internal Connectivity of Optical Cross Connects in Opaque Networks," International Conference on Integrated Optics and Optical Fiber Communication, OFC/IOOC '99 Technical Digest, vol. 1, Feb. 1999, pp. 159–161.

Wagner, "MONET: Multiwavelength Optical Networking," Journal of Lightwave Technology, vol. 14, No. 6, Jun. 1996, pp. 1349-1355.

Wauters et al., "Design of The Optical Path Layer in Multiwavelength Cross-connected Networks," IEEE Journal on Selected Areas in Communication, vol. 14, No. 5, 1996, pp. 881-892.

Weik, "Fiber Optics Standard Dictionary," Chapman & Hall, 1997, pp. 209, 617-618, and 1058.

Willner, "Optical Communications Tutorial for Judge Holderman," *Tellabs Operations, Inc.* v. *Fujitsu Limited and Fujitsu Network Communications, Inc.,* Civil Action No. 08 CV 3379, Docket No. 204, Aug. 27, 2009, 60 pages.

Willner, "Review of Fujitsu's Tutorial and Claim Construction for the '772 Patent," *Tellabs Operations, Inc.* v. *Fujitsu Limited and Fujitsu Network Communications, Inc.,* Civil Action No. 08 CV 3379, Docket No. 262, Feb. 18, 2010, 19 pages.

Willner et al., "Passive Equalization of Nonuniform EDFA Gain by Optical Filtering for Megameter Transmission of 20 WDM Channels Through a Cascade of EDFA's," IEEE Photonics Technology Letters, vol. 5, No. 9, Sep. 1993, 4 pages.

European Search Report dated Nov. 29, 2010, in European Application No. 07 796 705.7-2415, 5 pages.

International Search Report of PCT/US2007/015541, 7 pages.

International Preliminary Report on Patentability and Written Opinion of PCT/US2007/015541, 9 pages.

Request For Inter Partes Reexamination of U.S. Patent No. 7,369,772 (including exhibits), Reexamination Control No. 95/000,485, Fujitsu Limited, Jul. 6, 2009, 1828 pages (broken into multiple files for upload).

Non-final Office Action in Inter Partes Reexamination of U.S. Patent No. 7,369,772, Reexamination Control No. 95/000,485, Sep. 25, 2009, 96 pages.

Order Granting Request for Inter Partes Reexamination of U.S. Patent No. 7,369,772, Reexamination Control No. 95/000,485, Sep. 25, 2009, 16 pages.

Amendment and Response to Office Action in Inter Partes Reexamination of U.S. Patent No. 7,369,772, Reexamination Control No. 95/000,485, Nov. 25, 2009, 11 pages.

Comments by Third Party Requester After Patent Owner's Response in Inter Partes Reexamination of U.S. Patent No. 7,369,772, Reexamination Control No. 95/000,485, Dec. 28, 2009, 180 pages.

Comments by Third Party Requester After Patent Owner's Response in Inter Partes Reexamination of U.S. Patent No. 7,369,772, Reexamination Control No. 95/000,485, Jan. 4, 2010, 180 pages.

Rectified Comments by Third Party Requester After Patent Owner's Response in Inter Partes Reexamination of U.S. Patent No. 7,369,772, Reexamination Control No. 95/000,485, Mar. 17, 2010, 47 pages.

Action Closing Prosecution (with reference) in Inter Partes Reexamination of U.S. Patent No. 7,369,772, Reexamination Control No. 95/000,485, Jun. 24, 2010, 150 pages.

Right of Appeal Notice in Inter Partes Reexamination of U.S. Patent No. 7,369,772, Reexamination Control No. 95/000,485, Aug. 21, 2010, 8 pages.

Notice of Appeal to the Board of Patent Appeals and Interferences from the Examiner's Decision Cofirming Claims in the Reexamination of U.S. Patent No. 7,369,772, Reexamination Control No. 95/000,485, Sep. 10, 2010, 4 pages.

Third Party Requester's Appeal Brief to the Board of Patent Appeals and Interferences in the Inter Partes Reexamination of U.S. Patent No. 7,369,772, Reexamination Control No. 95/000,485, Nov. 10, 2010, 122 pages.

Patent Owner's Respondent Brief in the Inter Partes Reexamination of U.S. Patent No. 7,369,772, Reexamination Control No. 95/000,485, Dec. 10, 2010, 81 pages.

Third Party Requester's Appeal Brief to the Board of Patent Appeals and Interferences in the Inter Partes Reexamination of U.S. Patent No. 7,369,772, Reexamination Control No. 95/000,485, Jan. 10, 2011, 115 pages.

Patent Owner's Respondent Brief in the Inter Partes Reexamination of U.S. Patent No. 7,369,772, Reexamination Control No. 95/000,485, Feb. 9, 2011, 66 pages.

Examiner's Answer in the Inter Partes Reexamination of U.S. Patent No. 7,369,772, Reexamination Control No. 95/000,485, Feb. 28, 2011, 3 pages.

Third Party Requester's Rebuttal Brief to the Board of Patent Appeals and Interferences in the Inter Partes Reexamination of U.S. Patent No. 7,369,772, Reexamination Control No. 95/000,485, Mar. 28, 2011, 17 pages.

Non-final Office Action in U.S. Appl. No. 11/776,994, Apr. 12, 2010, 38 pages.

Amendment and Terminal Disclaimer in U.S. Appl. No. 11/776,994, Jul. 9, 2010, 22 pages.

Final Office Action in U.S. Appl. No. 11/776,994, Sep. 29, 2010, 44 pages.

Interview Summary in U.S. Appl. No. 11/776,994, Mar. 25, 2011, 3 pages.

Statement of Substance of Interview in U.S. Appl. No. 11/776,994, Mar. 29, 2011, 2 pages.

Non-final Office Action in U.S. Appl. No. 11/319,338, Dec. 12, 2008, 9 pages.

Amendment in U.S. Appl. No. 11/319,338, Mar. 11, 2009, 15 pages.

Non-final Office Action in U.S. Appl. No. 11/697,527, Dec. 29, 2009, 10 pages.

Amendment in U.S. Appl. No. 11/697,527, Apr. 21, 2010, 26 pages.

Non-final Office Action in U.S. Appl. No. 11/697,527, Jul. 8, 2010, 20 pages.

Amendment in U.S. Appl. No. 11/697,527, Sep. 15, 2010, 4 pages.

Ex Parte Quayle Action in U.S. Appl. No. 11/697,527, Dec. 3, 2010, 4 pages.

Response to Ex Parte Quayle Action in U.S. Appl. No. 11/697,527, Feb. 2, 2011, 20 pages.

Non-final Office Action in U.S. Appl. No. 11/697,527, Apr. 13, 2011, 12 pages.

Non-final Office Action in U.S. Appl. No. 11/697,513, Dec. 29, 2009, 9 pages.

Amendment in U.S. Appl. No. 11/697,513, Apr. 21, 2010, 59 pages.

Non-final Office Action in U.S. Appl. No. 11/697,513, Jul. 8, 2010, 12 pages.

Request For Ex Parte Reexamination of U.S. Patent No. 6,973,229, Reexamination Control No. 90/009,864, Dec. 23, 2010, 321 pages.

Non-final Office Action in U.S. Appl. No. 12/042,793, Dec. 29, 2008, 6 pages.

Amendment and Petition for Extension of Time in U.S. Appl. No. 12/042,793, Jun. 29, 2009, 7 pages.

Final Office Action in U.S. Appl. No. 12/042,793, Oct. 26, 2009, 9 pages.

Amendment in U.S. Appl. No. 12/042,793, Nov. 29, 2010, 24 pages.

Preliminary Amendment in U.S. Appl. No. 10/737,765, Dec. 17, 2003, 6 pages.

Preliminary Amendment in U.S. Appl. No. 10/737,765, Jul. 13, 2004, 8 pages.

Response to Notice of Non–compliant Amendment in U.S. Appl. No. 10/737,765, Aug. 2, 2004, 6 pages.

Non–final Office Action in U.S. Appl. No. 10/737,765, Mar. 8, 2007, 10 pages.

Amendment in U.S. Appl. No. 10/737,765, Sep. 10, 2007, 23 pages.

Notice of Allowance in U.S. Appl. No. 10/737,765, Nov. 29, 2007, 11 pages.

Amendment After Allowance and Statement of Substance of Interview in U.S. Appl. No. 10/737,765, Jan. 11, 2008, 15 pages.

Response to Rule 312 Communication in U.S. Appl. No. 10/737,765, Jan. 31, 2008, 3 pages.

Santos, J., "Net Expansion Depends on Optical Layer," Electronic Engineering Times, Dec. 1, 1997, 3 pages.

Fujitsu Limited's and Fujitsu Network Communications, Inc.'s Motion for Leave to File Amended Answer and Amended Counterclaims, Fujitsu Limited and Fujitsu Network Communications, Inc., Civil Action No. 08 CV 3379, Mar. 26, 2009.

Exhibit PAT–B in in Ex Parte Reexamination of U.S. Patent No. 7,369,772, Reexamination Control No. 90/010,763, Feb. 3, 2011, pp. 1–12.

Non–final Office Action in U.S. Appl. No. 09/293,775, May 21, 2002, 7 pages.

Preliminary Amendment in U.S. Appl. No. 09/293,775, Aug. 21, 2002, 6 pages.

Non–final Office Action in U.S. Appl. No. 09/293,775, Nov. 21, 2002, 10 pages.

Notice of Allowance/Allowability in U.S. Appl. No. 09/293,775, Aug. 26, 2003, 8 pages.

Letter Transmitting Corrected Drawings in U.S. Appl. No. 09/293,775, Nov. 25, 2003, 8 pages.

Notice of Allowance/Allowability in U.S. Appl. No. 09/293,775, Jun. 29, 2004, 3 pages.

Letter Transmitting Corrected Drawings in U.S. Appl. No. 09/293,775, May 21, 2003, 9 pages.

Amendment in U.S. Appl. No. 09/293,775, May 30, 2003, 20 pages.

Defendant Fujitsu Limited's Second Amended Answer and Affirmative Defenses to Plaintiff's Complaint and Defendant Fujitsu Limited's Second Amended Counterclaims Against Plaintiff, Tellabs, Inc. and Tellabs North America, Inc. and Demand for Jury Trial, *Tellabs Operations, Inc.* v. *Fujitsu Limited and Fujitsu Network Communications, Inc.*, Civil Action No. 08 CV 3379, Docket No. 386, Apr. 26, 2011, 69 pages.

Exhibits A through K in Defendant Fujitsu Limited's Second Amended Answer and Affirmative Defenses to Plaintiff's Complaint and Defendant Fujitsu Limited's Second Amended Counterclaims Against Plaintiff, Tellabs, Inc. and Tellabs North America, Inc., *Tellabs Operations, Inc.* v. *Fujitsu Limited and Fujitsu Network Communications, Inc.*, Civil Action No. 08 CV 3379, Docket No. 386–1, Apr. 26, 2011, 118 pages.

Exhibits L through Q in Defendant Fujitsu Limited's Second Amended Answer and Affirmative Defenses to Plaintiff's Complaint and Defendant Fujitsu Limited's Second Amended Counterclaims Against Plaintiff, Tellabs, Inc. and Tellabs North America, Inc., *Tellabs Operations, Inc.* v. *Fujitsu Limited and Fujitsu Network Communications, Inc.*, Civil Action No. 08 CV 3379, Docket No. 386–2, Apr. 26, 2011, 112 pages.

Exhibit R (Part I of II) in Defendant Fujitsu Limited's Second Amended Answer and Affirmative Defenses to Plaintiff's Complaint and Defendant Fujitsu Limited's Second Amended Counterclaims Against Plaintiff, Tellabs, Inc. and Tellabs North America, Inc., *Tellabs Operations, Inc.*, v. *Fujitsu Limited and Fujitsu Network Communications, Inc.*, Civil Action No. 08 CV 3379, Docket No. 386–3, Apr. 26, 2011, 134 pages.

Exhibit R (Part II of II) in Defendant Fujitsu Limited's Second Amended Answer and Affirmative Defenses to Plaintiff's Complaint and Defendant Fujitsu Limited's Second Amended Counterclaims Against Plaintiff, Tellabs, Inc. and Tellabs North America, Inc., *Tellabs Operations, Inc.* v. *Fujitsu Limited and Fujitsu Network Communications, Inc.*, Civil Action No. 08 CV 3379, Docket No. 386–4, Apr. 26, 2011, 73 pages.

Exhibits S and T in Defendant Fujitsu Limited's Second Amended Answer and Affirmative Defenses to Plaintiff's Complaint and Defendant Fujitsu Limited's Second Amended Counterclaims Against Plaintiff, Tellabs, Inc. and Tellabs North America, Inc., *Tellabs Operations, Inc.* v. *Fujitsu Limited and Fujitsu Network Communications, Inc.*, Civil Action No. 08 CV 3379, Docket No. 386–5, Apr. 26, 2011, 54 pages.

Defendant Fujitsu Network Communications, Inc.'s Second Amended Answer and Affirmative Defenses to Plaintiff's Complaint and Defendant Fujitsu Network Communicaitons, Inc.'s Second Amended Counterclaims Against Plaintiff, Inc. and Demand for Jury Trial, Tellabs, Inc. and Tellabs North America, Inc., *Tellabs Operations, Inc.* v. *Fujitsu Limited and Fujitsu Network Communications, Inc.*, Civil Action No. 08 CV 3379, Docket No. 387, Apr. 26, 2011, 64 pages.

Exhibits A through K in Defendant Fujitsu Network Communications, Inc.'s Second Amended Answer and Affirmative Defenses to Plaintiff's Complaint and Defendant Fujitsu Network Communications, Inc.'s Second Amended Counterclaims Against Plaintiff and Demand for Jury Trial, Tellabs, Inc. and Tellabs North America, Inc., *Tellabs Operations, Inc.*, v. *Fujitsu Limited and Fujitsu Network Communications, Inc.*, Civil Action No. 08 CV 3379, Docket No. 387–1, Apr. 26, 2011, 118 pages.

Exhibits L through Q in Defendant Fujitsu Network Communications, Inc.'s Second Amended Answer and Affirmative Defenses to Plaintiff's Complaint and Defendant Fujitsu Network Communications, Inc.'s Second Amended Counterclaims Against Plaintiff and Demand for Jury Trial, Tellabs, Inc. and Tellabs North America, Inc., *Tellabs Operations, Inc.*, v. *Fujitsu Limited and Fujitsu Network Communications, Inc.*, Civil Action No. 08 CV 3379, Docket No. 387–2, Apr. 26, 2011, 112 pages.

Exhibit R (Part I of II) in Defendant Fujitsu Network Communications, Inc.'s Second Amended Answer and Affirmative Defenses to Plaintiff's Complaint and Defendant Fujitsu Network Communications, Inc.'s Second Amended Counterclaims Against Plaintiff and Demand for Jury Trial, Tellabs, Inc. and Tellabs North America, Inc., *Tellabs Operations, Inc.,* v. *Fujitsu Limited and Fujitsu Network Communications, Inc.,* Civil Action No. 08 CV 3379, Docket No. 387–3, Apr. 26, 2011, 134 pages.

Exhibit R (Part II of II) in Defendant Fujitsu Network Communications, Inc.'s Second Amended Answer and Affirmative Defenses to Plaintiff's Complaint and Defendant Fujitsu Network Communications, Inc.'s Second Amended Counterclaims Against Plaintiff and Demand for Jury Trial, Tellabs, Inc., and Tellabs North America, Inc., *Tellabs Operations, Inc.* v. *Fujitsu Limited and Fujitsu Network Communications, Inc.,* Civil Action No. 08 CV 3379, Docket No. 387–4, Apr. 26, 2011, 73 pages.

Defendant Fujitsu Limited'Third Amended Answer and Affirmative Defenses to Plaintiff's Complaint and Defendant Fujitsu Limited's Third Amended Counterclaims Against Plaintiff, Tellabs, Inc. and Tellabs North America, Inc. and Demand for Jury Trial, *Tellabs Operations, Inc.,* v. *Fujitsu Limited and Fujitsu Network Communications, Inc.,* Civil Action No. 08 CV 3379, Docket No. 395, May 12, 2011, 69 pages.

Exhibits A through K in Defendant Fujitsu Limited's Third Amended Answer and Affirmative Defenses to Plaintiff's Complaint and Defendant Fujitsu Limited's Third Amended Counterclaims Against Plaintiff, Tellabs, Inc. and Tellabs North America, Inc. and Demand for Jury Trial, *Tellabs Operations, Inc.,* v. *Fujitsu Limited and Fujitsu Network Communications, Inc.,* Civil Action No. 08 CV 3379, Docket No. 395–1, May 12, 2011, 118 pages.

Exhibits L through Q in Defendant Fujitsu Limited's Third Amended Answer and Affirmative Defenses to Plaintiff's Complaint and Defendant Fujitsu Limited's Third Amended Counterclaims Against Plaintiff, Tellabs, Inc. and Tellabs North America, Inc. and Demand for Jury Trial, *Tellabs Operations, Inc.* v. *Fujitsu Limited and Fujitsu Network Communications, Inc.,* Civil Action No. 08 CV 3379, Docket No. 395–2, May 12, 2011, 112 pages.

Exhibit R (Part I of II) in Defendant Fujitsu Limited's Third Amended Answer and Affirmative Defenses to Plaintiff's Complaint and Defendant Fujitsu Limited's Third Amended Counterclaims Against Plaintiff, Tellabs, Inc. and Tellabs North America, Inc. and Demand for Jury Trial, *Tellabs Operations, Inc.,* v. *Fujitsu Limited and Fujitsu Network Communications, Inc.,* Civil Action No. 08 CV 3379, Docket No. 395–3, May 12, 2011, 134 pages.

Exhibit R (Part II of II) in Defendant Fujitsu Limited's Third Amended Answer and Affirmative Defenses to Plaintiff's Complaint and Defendant Fujitsu Limited's Third Amended Counterclaims Against Plaintiff, Tellabs, Inc. and Tellabs North America, Inc. and Demand for Jury Trial, *Tellabs Operations, Inc.,* v. *Fujitsu Limited and Fujitsu Network Communications, Inc.,* Civil Action No. 08 CV 3379, Docket No. 395–4, May 12, 2011, 73 pages.

Exhibits S and T in Defendant Fujitsu Limited's Third Amended Answer and Affirmative Defenses to Plaintiff's Complaint and Defendant Fujitsu Limited's Third Amended Counterclaims Against Plaintiff, Tellabs, Inc. and Tellabs North America, Inc. and Demand for Jury Trial, *Tellabs Operations, Inc.,* v. *Fujitsu Limited and Fujitsu Network Communications, Inc.,* Civil Action No. 08 CV 3379, Docket No. 395–5, May 12, 2011, 54 pages.

Defendant Fujitsu Network Communications, Inc.'s Third Amended Answer and Affirmative Defenses to Plaintiff's Complaint and Defendant Fujitsu Network Communications, Inc.'s Third Amended Counterclaims Against Plaintiff and Demand for Jury Trial, *Tellabs Operations, Inc.,* v. *Fujitsu Limited and Fujitsu Network Communications, Inc.,* Civil Action No. 08 CV 3379, Docket No. 396, May 12, 2011, 64 pages.

Exhibits A through K in Defendant Fujitsu Network Communications, Inc.'s Third Amended Answer and Affirmative Defenses to Plaintiff's Complaint and Defendant Fujitsu Network Communications, Inc.'s Third Amended Counterclaims Against Plaintiff and Demand for Jury Trial, *Tellabs Operations, Inc.,* v. *Fujitsu Limited and Fujitsu Network Communications, Inc.,* Civil Action No. 08 CV 3379, Docket No. 396–1, May 12, 2011, 118 pages.

Exhibits L through Q in Defendant Fujitsu Network Communications, Inc.'s Third Amended Answer and Affirmative Defenses to Plaintiff's Complaint and Defendant Fujitsu Network Communications, Inc.'s Third Amended Counterclaims Against Plaintiff and Demand for Jury Trial, *Tellabs Operations, Inc.,* v. *Fujitsu Limited and Fujitsu Network Communications, Inc.,* Civil Action No. 08 CV 3379, Docket No. 396–2, May 12, 2011, 112 pages.

Exhibit R (Part I of II) in Defendant Fujitsu Network Communications, Inc.'s Third Amended Answer and Affirmative Defenses to Plaintiff's Complaint and Defendant Fujitsu Network Communications, Inc.'s Third Amended Counterclaims Against Plaintiff and Demand for Jury Trial, *Tellabs Operations, Inc.,* v. *Fujitsu Limited and Fujitsu Network Communications, Inc.,* Civil Action No. 08 CV 3379, Docket No. 396–3, May 12, 2011, 134 pages.

Exhibit R (Part II of II) in Defendant Fujitsu Network Communications, Inc.'s Third Amended Answer and Affirmative Defenses to Plaintiff's Complaint and Defendant Fujitsu Network Communications, Inc.'s Third Amended Counterclaims Against Plaintiff and Demand for Jury Trial, *Tellabs Operations, Inc.,* v. *Fujitsu Limited and Fujitsu Network Communications, Inc.,* Civil Action No. 08 CV 3379, Docket No. 396–4, May 12, 2011, 73 pages.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 14-16 are cancelled.
Claims 1-13 and 17-24 were not reexamined.

\* \* \* \* \*

(12) INTER PARTES REEXAMINATION CERTIFICATE (665th)
United States Patent
Gerstel et al.

(10) Number: US 7,369,772 C2
(45) Certificate Issued: Aug. 13, 2013

(54) OPTICAL LINE TERMINAL ARRANGEMENT, APPARATUS AND METHODS

(75) Inventors: Ornan A. Gerstel, Los Altos, CA (US); Rajiv Ramaswami, Sunnyvale, CA (US)

(73) Assignee: Tellabs Operations Inc., Naperville, IL (US)

Reexamination Request:
No. 95/000,485, Jul. 6, 2009

Reexamination Certificate for:
Patent No.: 7,369,772
Issued: May 6, 2008
Appl. No.: 10/737,765
Filed: Dec. 18, 2003

Reexamination Certificate C1 7,369,772 issued Aug. 9, 2011

Related U.S. Application Data

(62) Division of application No. 09/293,775, filed on Apr. 19, 1999, now Pat. No. 6,721,508.

(60) Provisional application No. 60/112,510, filed on Dec. 14, 1998.

(51) Int. Cl.
*H04J 14/02* (2006.01)
*H04J 14/00* (2006.01)

(52) U.S. Cl.
USPC .................. 398/79; 398/45; 398/48; 398/82; 398/83

(58) Field of Classification Search
None
See application file for complete search history.

(56) References Cited

To view the complete listing of prior art documents cited during the proceeding for Reexamination Control Number 95/000,485, please refer to the USPTO's public Patent Application Information Retrieval (PAIR) system under the Display References tab.

*Primary Examiner* — Deandra M Hughes

(57) ABSTRACT

A wavelength division multiplexed optical communication system including a first optical line interface optically coupled to a first transponder and an optical demultiplexer through which the first optical line interface is not optically coupled to the first transponder. The system also includes a second optical line interface and at least one switch. The switch is operable to optically couple the second optical line interface to (a) the first optical line interface through at least the optical demultiplexer, and alternatively (b) the second transponder. A method for an optical add/drop multiplexing system also is provided.

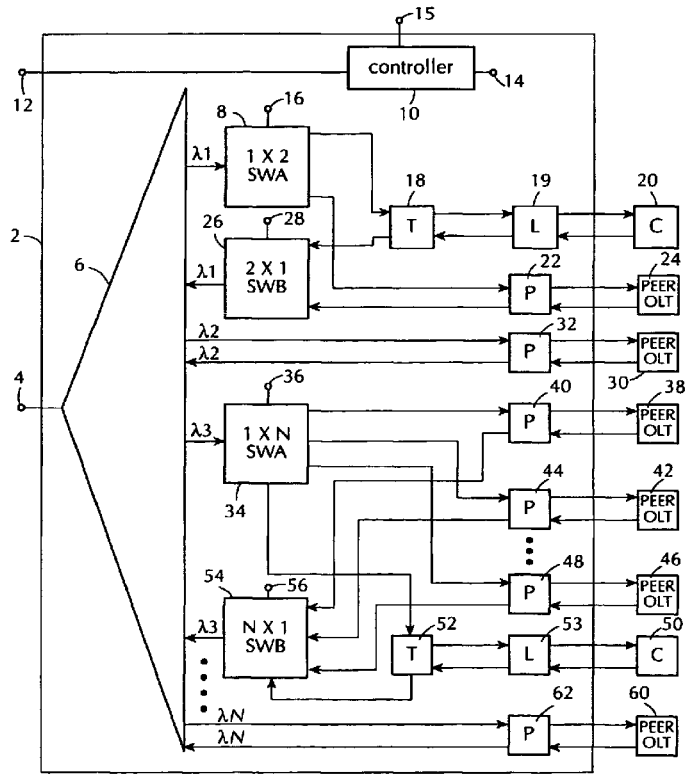

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 14-16 were previously cancelled.
Claims 1-13 and 17-24 are cancelled.

\* \* \* \* \*